(12) United States Patent
Sulman

(10) Patent No.: US 9,585,314 B2
(45) Date of Patent: Mar. 7, 2017

(54) TREE HARVESTERS

(75) Inventor: Richard Sulman, Highfields (AU)

(73) Assignee: Bionic Beaver Pty Limited, Toowoomba, Queensland (AU)

( * ) Notice: Subject to any disclaimer, the term of this patent is extended or adjusted under 35 U.S.C. 154(b) by 1410 days.

(21) Appl. No.: 13/375,566

(22) PCT Filed: Apr. 13, 2010

(86) PCT No.: PCT/AU2010/000403
§ 371 (c)(1),
(2), (4) Date: Dec. 1, 2011

(87) PCT Pub. No.: WO2010/129986
PCT Pub. Date: Nov. 18, 2010

(65) Prior Publication Data
US 2012/0073705 A1    Mar. 29, 2012

(30) Foreign Application Priority Data

May 15, 2009 (AU) ................................ 2009902193
Oct. 12, 2009 (AU) ................................ 2009904948

(51) Int. Cl.
*A01G 23/093* (2006.01)

(52) U.S. Cl.
CPC .................. *A01G 23/093* (2013.01)

(58) Field of Classification Search
CPC ........ B27L 11/00; B27L 11/005; B27L 11/02; B27L 11/06; B02C 4/286; B02C 18/22;
(Continued)

(56) References Cited

U.S. PATENT DOCUMENTS 3,651,845 A    3/1972 Propst
3,661,333 A  * 5/1972 Smith ................... B27L 11/002
                                                    144/162.1
(Continued)

FOREIGN PATENT DOCUMENTS

WO    W000/52998 A1    9/2000
WO    WO2007/066161 A1  6/2007
WO    WO2008/141671 A1  11/2008

*Primary Examiner* — Matthew G Katcoff
(74) *Attorney, Agent, or Firm* — William H. Eilberg

(57) ABSTRACT

A tree harvester, suitable for harvesting small trees in row(s) as a source of biomass, has a harvesting head with a chipper drum and complementary anvil. A pick-up front has at least one spiral and guide member, such as a guide rail or counter-rotating spiral, to maintain a tree in a substantially vertical position when, and after, its stem is cut by a base cutter. The pick-up front has a support plate or conveyor, which co-operates with the at least one spiral or guide member pair, to convey the tree to a location about the chipper drum, for engagement by at least one pair of nip rollers above the chipper drum, while maintaining the tree in the substantially vertical position. The, or each, pair of nip rollers feeds the tree downwardly (and rearwardly) to the chipper drum, while still maintaining the tree in the substantially vertical position, for conversion to biomass, such as woodchips.

The harvester may have two-or-more of the harvester heads arranged side-by-side to enable trees in adjacent rows to be harvested.

13 Claims, 25 Drawing Sheets

(58) Field of Classification Search
CPC . B02C 18/2225; B02C 18/2258; A01G 23/02; A01G 23/06; A01G 23/08; A01G 23/093; A01G 3/002; B01D 45/02
USPC .......................... 198/625, 663; 37/301, 302
See application file for complete search history.

(56) References Cited

U.S. PATENT DOCUMENTS

| | | | |
|---|---|---|---|
| 3,848,399 A | 11/1974 | Makeham | |
| 4,232,719 A | 11/1980 | Payton | |
| 6,945,292 B1* | 9/2005 | Giles et al. | 144/337 |
| 2004/0170759 A1* | 9/2004 | Bardos | B27N 1/00 427/212 |

* cited by examiner

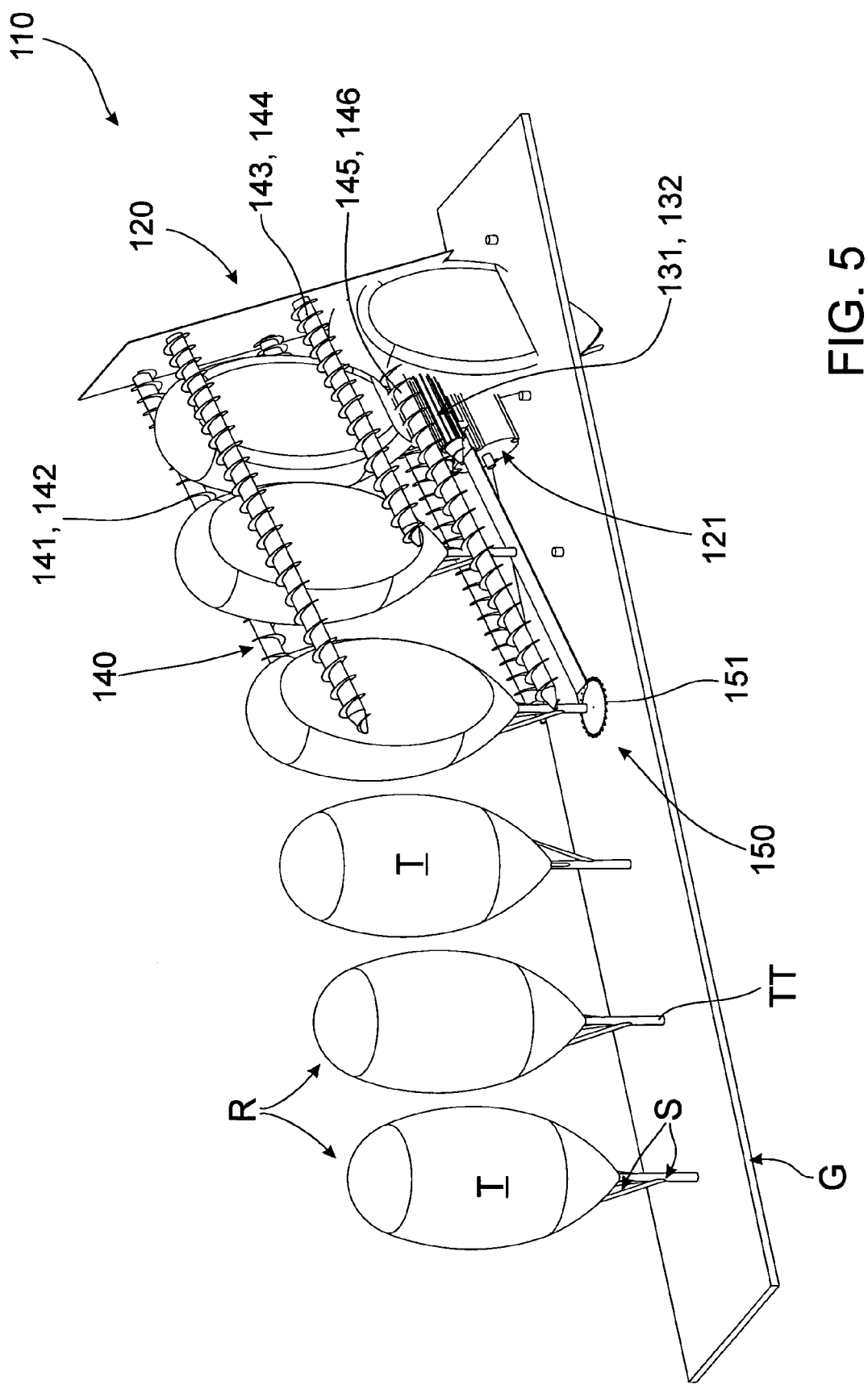

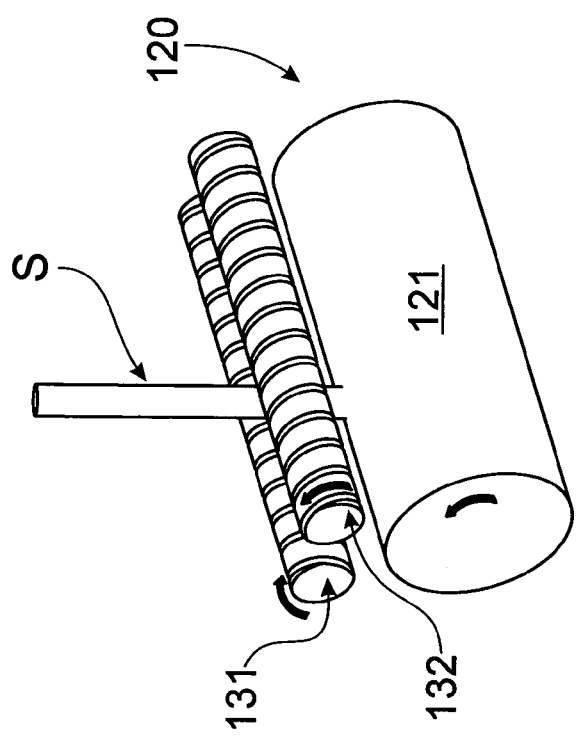
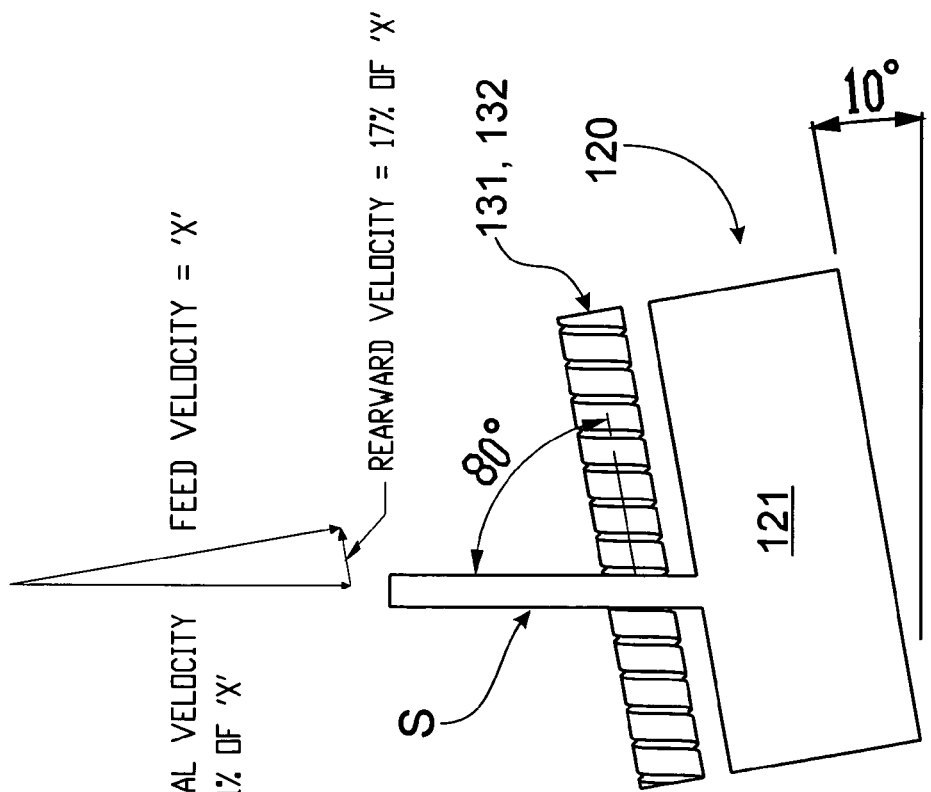
FIG. 7
FIG. 6

TREE HARVESTERS

BACKGROUND OF THE INVENTION

1. Field of the Invention

THIS INVENTION relates to tree harvesters.

The invention particularly relates, but is not limited to, tree harvesters suitable for harvesting shrubs, coppice or sapling trees, where such trees are planted at preferably regular spacings in rows.

2. Dictionary

The term "small trees" shall be used throughout the specification to describe shrubs and trees which have either a single-stemmed sapling form; or a plurality of coppice stems extending generally upwards from a tree stump or lignotuber; and by example, includes trees of the *Eucalyptus* and *Acacia* genera indigenous to Australia; and of the *Salix* and *Populus* genera indigenous to Europe and North America.

The term "in a substantially vertical position" will be used throughout the specification to indicate that a stem of a tree is inclined at an angle (preferably) no more than 30° to the vertical Z axis.

3. Prior Art

It has been proposed, in Australia, to grow trees of the *Eucalyptus* and *Acacia* genera as an ecologically-based answer to mankind's problems.

As the *Eucalyptus* and *Acacia* genera are fast-growing, their biomass can be used as a "renewable" source of energy, as the trees can be harvested every 2-6 years.

The second benefit of planting these trees is that some of the trees within the genera are salt tolerant and can be planted in areas, e.g., in Western Australia, where increased salinity levels have retarded the growing of other crops. The trees can also assist in lowering the water table, thereby reducing increases in the salinity levels near the soil surface.

Furthermore, they will take up $CO_2$ gas from the atmosphere; and thereby assist the fight against global-warming.

The one disincentive to the proposal has been the ability to economically harvest the trees and transport the biomass from the tree growing areas to industry processors e.g., the electricity generating authorities, who will process the biomass to produce activated carbon or oil, and generate electricity.

It is not possible, with existing tree harvesters, to be able to achieve harvesting and transport costs that are economically viable.

In Europe, forage harvesters/maize harvesters/corn harvesters, e.g., of the types sold under the "Claas", "Krone", "New Holland" and "John Deere" Trade Marks have been modified to harvest certain trees. An example of such a "PRIOR ART" modified harvester will be hereinafter described with reference to FIGS. 1 to 3 of the accompanying drawings. These modified harvesters, however, have only been used to harvest European deciduous tree species, which generally have small-diameter, straight stems, and which are only harvested after they have dropped their leaves.

SUMMARY OF THE PRESENT INVENTION

It is an object of the present invention to provide a method for harvesting small trees (as hereinbefore defined) or the like.

It is a preferred object of the present invention to provide a harvester head, for a tree harvester, suitable for harvesting small trees (as hereinbefore defined) or the like.

It is another preferred object to provide such a harvester head which can be advanced continuously along a row of trees.

It is a further preferred object to provide such a head where the stems of the trees are maintained substantially vertically as the trees are fed to, and processed by, a chipper or chopper drum.

It is a further preferred object to provide a harvesting head, for harvesting small trees, based on a conversion of the harvesting head(s) of the "PRIOR ART" harvesters of the types hereinbefore described.

It is a still further preferred object to provide a tree harvester, suitable for the harvesting of small trees, provided with at least one of the harvesting heads of the present invention.

Other preferred objects of the present invention will become apparent from the following description.

In one aspect, the present invention resides in a method of harvesting a row of small trees, including the steps of:
  advancing at least one rotating spiral and horizontally spaced guide member, forming an inlet passage of a harvester head, to engage the stems and/or foliage of the trees in the row;
  cutting the stems of the trees by a base cutter on the harvester head;
  conveying the trees, maintained in a substantially vertical position by the, or each, rotating spiral and spaced guide member, to a location above a rotating chipper or chopper drum for engagement by at least one pair of nip rollers; and
  feeding the trees downwardly to the rotating chipper or chopper drum by the, or each, pair of nip rollers, while maintaining the trees in the substantially vertical position.

Preferably, lower ends of the cut stems are supported by an upwardly inclined surface, after the stems are cut and until engagement of the stems by the, or each, pair of nip rollers.

Preferably, the, or each, guide member is a guide rail, or a counter-rotating spiral, having an upwardly inclined longitudinal axis or axis of rotation, parallel to an axis of rotation of the rotating spiral, and operable to convey the trees in an upwardly rearward path at a linear speed greater than the speed of advance of the harvester head.

Preferably, the trees are fed rearwardly relative to the chipper or chopper drum while being maintained in the substantially vertical position.

In a second aspect, the present invention resides in a harvesting head for a tree harvester, the harvester head including:
  a chipper or chopper drum rotatable about a first axis;
  at least one pair of nip rollers rotatable about respective substantially parallel second and third axes, vertically spaced above the first axis; and
  at least one drive means to rotatably drive the chipper or chopper drum and the, or each, pair of nip rollers; so arranged that:
  the first, second and third axes are disposed substantially parallel to the direction of travel of the tree harvester, and are upwardly inclined to the horizontal from a leading end to a trailing end, so that the, or each, pair of nip rollers are operable to maintain a stem of a tree being harvested in a substantially vertical position, while feeding the tree downwardly through the chipper or chopper drum.

In a third aspect, the present invention resides in a harvesting head for a tree harvester, to harvest a row of trees, the harvesting head including:

a chipper or chopper drum rotatable about a first axis;

at least one pair of nip rollers rotatable about respective substantially parallel second and third axes, vertically spaced above the first axis; and at least one drive means to rotatably drive the chipper or chopper drum and the, or each, pair of nip rollers; so arranged that:

the first, second and third axes are disposed substantially transverse to the direction of travel of the tree harvester; where the second axis is forwardly spaced relative to the first axis, and the third axis is rearwardly spaced from the second axis and vertically spaced a small distance there-above, so that the, or each, pair of nip rollers are operable to maintain the stem of a tree being harvested in a substantially vertical position while feeding the stem of the tree downwardly to the chipper or chopper drum.

Preferably, the harvesting head has a pick-up front, having at least one rotating spiral and horizontally spaced guide member, forming an inlet passage vertically spaced above, and extending forwardly of, the, or each, pair of nip rollers; where the, or each, rotating spiral and guide member pair are operable to engage and maintain the trees with their stems in a substantially vertical position, before and/or after the stems have been cut from their respective tree stumps and both before and during engagement by the, or each, pair of nip rollers.

Preferably, the pick-up front has two, or more preferably three, rotating spiral and guide member pairs, vertically spaced apart.

Preferably, the, or each, guide member is a guide bar or rail, or a counter-rotating spiral.

Preferably, the longitudinal axis of the, or each, guide bar or rail and/or the rotational axes of the, or each, spiral and counter-rotating spiral are upwardly inclined from their leading ends to their trailing ends.

Preferably, in a harvester head of the second aspect, the inclination of the longitudinal axis and/or the rotational axes is substantially equal to the inclination of the first, second and third axes.

Preferably, the, or each, spiral and counter-rotating spiral has a substantially horizontal "lead-in" spiral to assist in directing the trees to the harvesting head.

Preferably, a base cutter extends forwardly from the harvester head, and has a cutting head operable to sever the stems of the trees from their stumps, the cutter head being mounted at the (distal) forward end of a support plate or conveyor, preferably inclined to the horizontal substantially identical to the inclination of the longitudinal axis and the rotational axes, the support plate or conveyor being operable to support lower ends of the stems as the trees are advanced towards the, or each, pair of nip rollers by the pick-up front.

Preferably, the cutter head has a rotary saw disc, chainsaw head, or like cutting means, arranged substantially parallel to, but just above, the level of the ground.

Preferably, the, or each, pair of nip rollers directs the lower ends of the stems of the trees downwardly and rearwardly along a path between the chipper or chopper drum and a co-operating anvil to cause the stems and foliage of the trees to be chipped.

Preferably, the, or each, drive means for the chipper or chopper drum, the, or each, pair of nip rollers, and the other components of the harvesting head, include respective hydraulic motors connected to a main hydraulic pump and controlled via suitable hydraulic control valves, e.g., in an operator's cabin or station.

In a fourth aspect, the present invention resides in a tree harvester, for harvesting at least one row of trees, including:

a harvester chassis mountable on, or attachable to, a prime mover;

at least one drive means on the harvester chassis; and at least one harvesting head, as hereinbefore described with respect to the second or third aspects, operably mounted on the harvester chassis and operably connected to the, or each, drive means.

Preferably, the harvester chassis is mounted on a self-propelled prime mover; or the harvester chassis is mounted on a trailer-like vehicle connectable to a tractor or other suitable prime mover.

Preferably, a chip collector is mounted below the, or each, chipper or chopper drum; and at least one conveyor, such as a belt conveyor, a pneumatic conveyor, or other suitable conveyor, transfers the chips from the, or each, chipper or chopper drum to the chip collector, such as a bin or hopper; or to an out-loading conveyor for discharge to a transport vehicle.

BRIEF DESCRIPTION OF THE DRAWINGS

To enable the invention to be fully understood, preferred embodiments of the tree harvester, in accordance with the present invention, will now be described with reference to the accompanying drawings, in which:

FIG. 5 is a schematic perspective view of the harvester head of the first embodiment;

FIG. 6 is a schematic view showing the relationship of the nip rollers and the chipper drum to the stem of a tree; and FIG. 7 is a perspective view corresponding to FIG. 6;

DETAILED DESCRIPTION OF THE PREFERRED EMBODIMENTS

1. Prior Art

Figure 1:
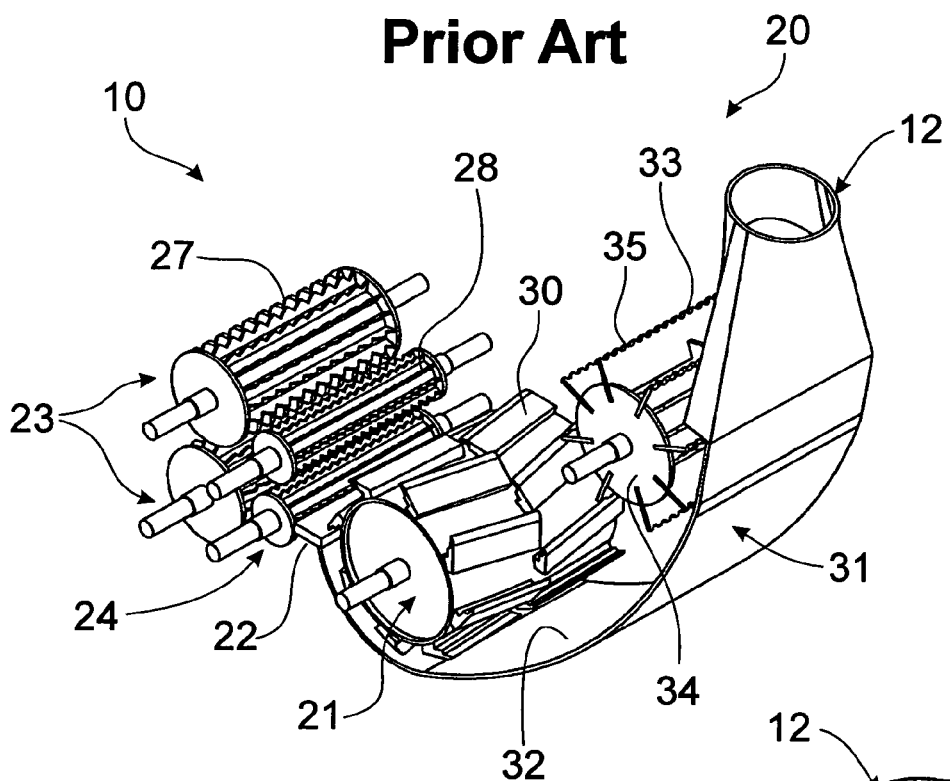
FIGS. 1 and 2 are schematic isometric drawings of a PRIOR ART harvester, e.g., of the types sold under the "Claas", "Krone", "New Holland" and "John Deere" Trade Marks.
Figure 2:
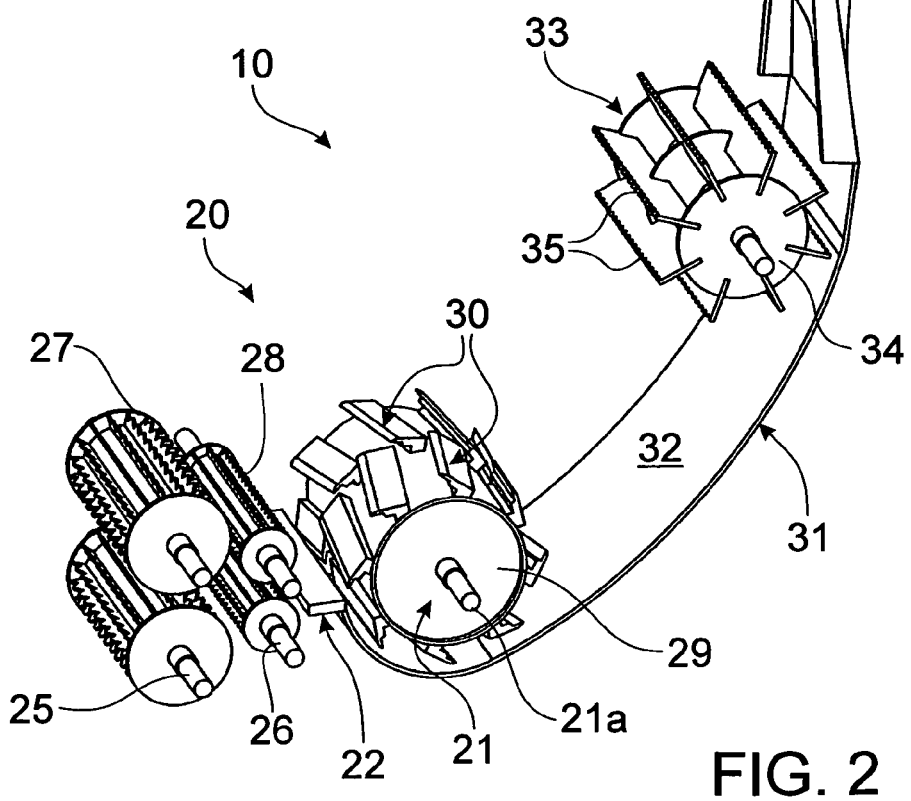
Figure 3:
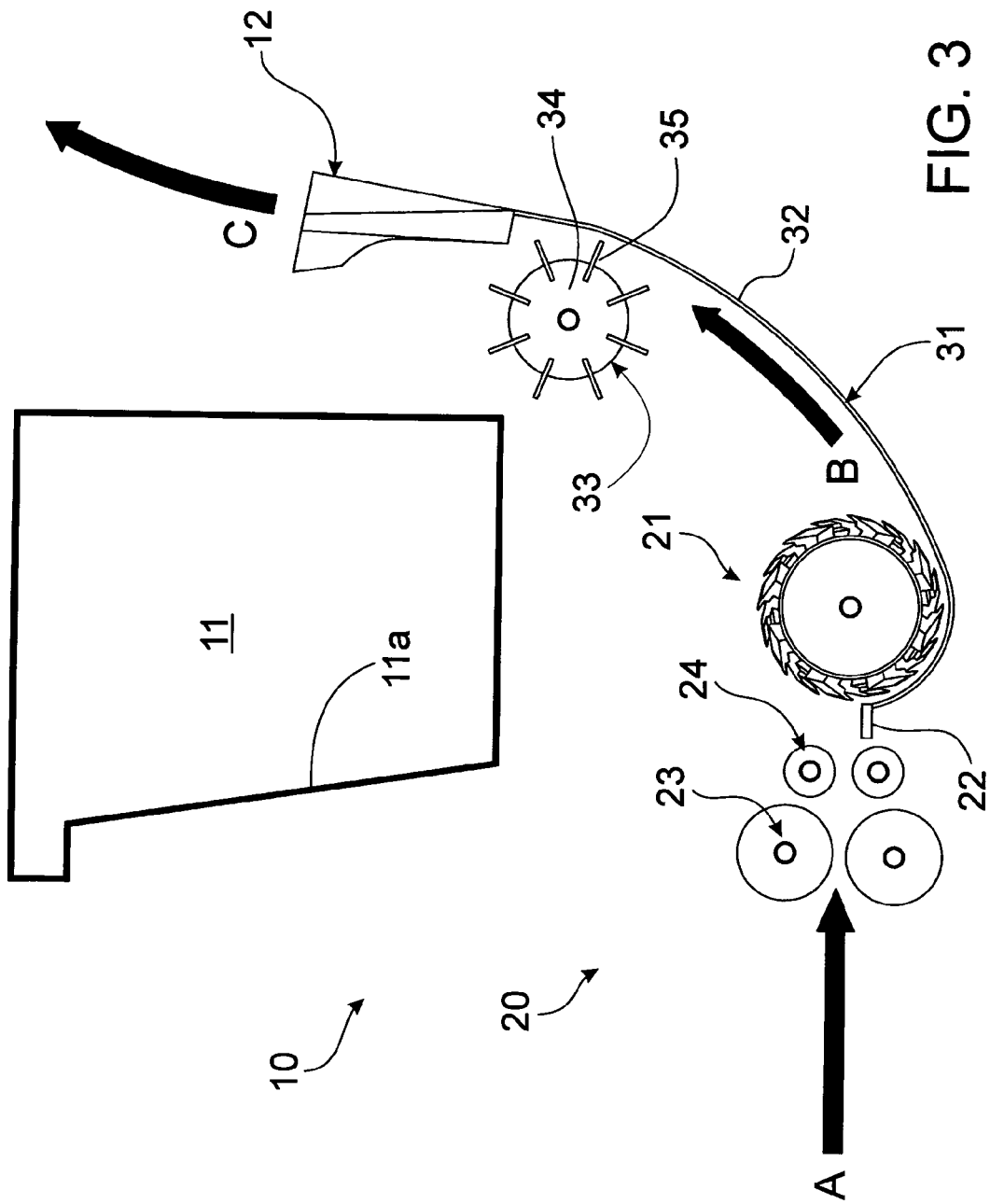
FIG. 3 is a schematic side elevational view of the PRIOR ART harvester.
Figure 4:
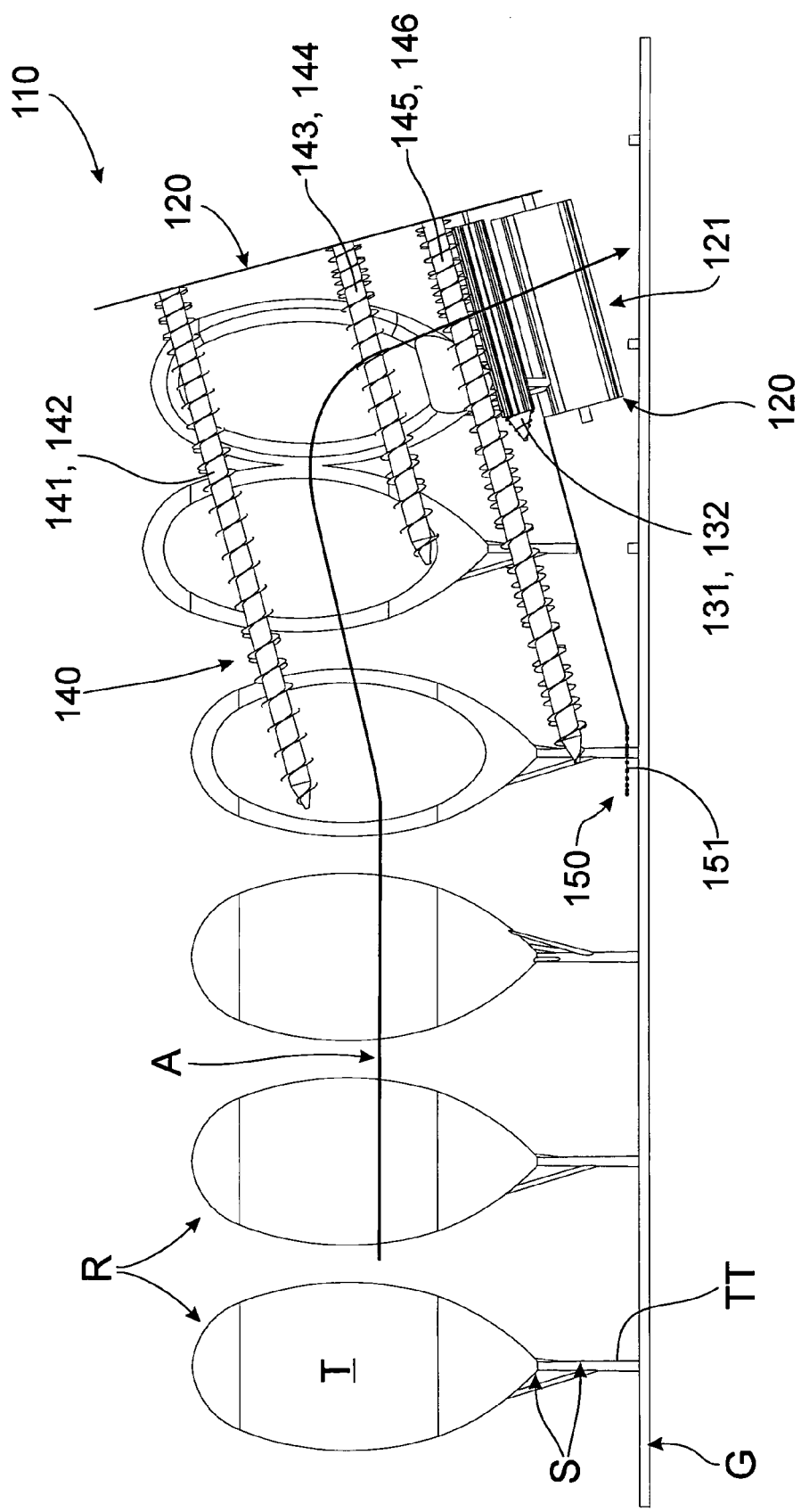
FIG. 4 is a schematic side view showing a harvester head of a first embodiment of the present invention.

FIGS. 1 to 3 illustrate an PRIOR ART forage/maize/corn harvester 10, of the types sold under the "Claas", "Krone", "New Holland" and "John Deere" Trade Marks, used as a tree harvester.

The PRIOR ART harvester 10 has a self-propelled prime mover (not shown) with a chassis mounted on four wheel/tyre assemblies, where one pair of the wheel/tyre assemblies are steerable; and at least one pair of the wheel/tyre assemblies are driven by high pressure hydrostatic motors, connected to hydraulic pump(s) and controlled via control valves in the operator's cabin or station 11.

The skilled addressee will appreciate that the prime mover may, in some applications, be mounted on a pair of crawler tracks; or the chassis may be towed behind another prime mover, such as a tractor.

The hydraulic pump(s) are powered by a diesel engine, which may be of (preferably super-charged or turbo-charged) V8 or V12 configuration.

The harvester 10 has an out-loading conveyor (not shown), to transfer the biomass to another transport vehicle, also not shown, to transport the biomass from the harvesting area to the proposed user. The other transport vehicle may be self-propelled, towed by another vehicle, or towed by the tree harvester itself.

The out-loading conveyor is operably connected to an outlet 12 and is preferably rotatably mounted thereon.

The harvesting head 20, is mounted on a frame (not shown), hingedly mounted on the chassis by suitable links, and may be raised and lowered relative to the ground (by hydraulic ram(s)) to adjust the height above the ground at which the corn stalks are cut. The cutting head and a part of the feeding apparatus to feed the tree stems to the chopper 21 in the harvesting head 20 have been omitted for clarity.

When cut, the tree stems are transported substantially horizontally in the direction of arrow A (see FIG. 3) and are advanced towards the chopper 21, and its complementary fixed anvil 22, by opposed first and second pairs of counter-rotating feed rollers 23, 24, rotatable about substantially horizontal shafts 25, 26; where the feed rollers 23, 24 have sets of radially-extending "serrated" cleats 27, 28.

The chopper 21 has a cylindrical body 29, on which are mounted two rows of chopper blades 30, with their axes inclined to the chopper shaft 31 (and fixed anvil 22), and arranged to "slice" or otherwise cut the tree stems into short lengths as they engage the chopper blades 30 while the chopper 21 is rotating at high speed.

The chopped lengths of the tree stems move in the direction of arrow B, within chute 31, having a rear wall 32, and are accelerated by an accelerator 33 having a cylindrical drum 34, driven at relatively high speed, the drum 34 having radially-extending blades or paddles 35.

The now-accelerated chopped lengths of the tree stems pass through the outlet 12 and travel in the direction of arrow C to the out-loading conveyor.

It will be noted that in the prior art harvester 10, the operator's cabin or station 11 is mounted above the chopper 21; and indeed the front wall 11a thereof overlies the pairs of feed rollers 23, 24. This means it is difficult, if not impossible, for trees in a substantially vertical position to be guided down into the chopper 21.

2. Present Invention

FIGS. 4 to 7 illustrate a tree harvester 110, having at least one harvesting head 120 in accordance with the first embodiment of the present invention. The tree harvester 110 will preferably have a self-propelled prime mover with its chassis mounted on (preferably) four or more wheel/tyre assemblies, or a pair of crawler tracks, where at least one pair of the wheel/tyre assemblies, or the crawler tracks, are driven by high pressure hydrostatic motors connected to a hydraulic drive pump controlled via control valves in an operator's cabin or station.

Preferably, the hydraulic drive pump will be powered by a diesel engine (or like power plant). However, it will be readily apparent to the skilled addressee that alternative mechanical drive transmissions may interconnect the engine and the drive wheel/tyre assemblies, or the crawler tracks.

In an alternative embodiment, the tree harvester 110 may have a chassis towed behind, or pushed by, a separate prime mover; where the components on the tree harvester 110 are powered by the diesel engine (or like power plant) of the prime mover, or via a self-contained power unit on the harvester chassis.

Depending on the intended means of transporting the woodchips from the harvesting area to the proposed user, the tree harvester 110 may have one or more containers, e.g., bins or hoppers, to receive the woodchips from the, or each, harvesting head 120 and at least one out-loading conveyor to transfer the woodchips to another transport vehicle; or at least one out-loading conveyor which receives the woodchips directly from the, or each, harvesting head 120 to transfer the woodchips to a separate transport vehicle.

In the first embodiment illustrated in FIGS. 4 to 7, the tree harvester 110 has a single harvesting head 120, illustrated in schematic form, adapted to harvest small trees T arranged to be substantially equally spaced (e.g., at 2 meter spacing's) along rows R. The trees T may have one or more stems S extending up from a tree trunk TT above a tree stump TS.

It will be readily apparent to the skilled addressee, that where the rows of trees T are provided at regular spacing's apart, the harvester 110 may have two or more harvester heads 120 arranged side-by-side to simultaneously harvest the trees T in adjacent rows R.

Each harvesting head 120 is mounted on the chassis, or support frame, not shown, of the harvester 110, eg., by pairs of parallel links where the parallel links can be raised or lowered, eg., by hydraulic jacks to enable the harvester head(s) 120 to be raised and lowered relative to the ground level G.

An elongate, cylindrical, chipper drum 121, is rotatably mounted on the harvester head 120 via a drum shaft 122 operably connected to a hydrostatic motor (not shown). A pair of nip rollers 131, 132 are provided spaced a short distance above the chipper drum 121, and have respective drive shafts 133 connected to respective hydrostatic motors and are arranged for counter-rotating drive.

The respective axes of rotation of the chipper drum 121 and the nip rollers 131, 132 are upwardly inclined from their forward ends to their trailing ends, at an angle of, e.g., 10°. (The angle of inclination is preferably in the range of 1-30°, more preferably, 5 to 15°, most preferably 10°.)

NB: The "spirals" shown around the nip rollers 131, 132 in FIGS. 6 and 7 are by way of illustration only. Preferably, the nip rollers 131, 132 will have elongate cleats 134 extending substantially radially from the nip rollers 131, 132.

The relative rotational speeds of the nip rollers 131, 132 to the chipper drum 121 will be selected so that the nip rollers 131, 132 will progressively feed the stems S (and then the foliage F) of the trees T downwardly and rearwardly relative to the chipper drum 121 as the tree harvester 110 continuously advances along the row(s) R of the trees T.

A pick-up front 140 is provided above, and extends forwardly of, the pair of nip rollers 131, 132. In the embodiment illustrated in FIGS. 4 and 5, the pick-up front 140 has three vertically spaced pairs of counter-rotating spirals 141, 142; 143, 144; and 145, 146.

The spirals 141-146 have their rotational axes inclined to the horizontal at the same angle of inclination as for the rotational axes of the chipper drum 121 and nip rollers 131, 132; and they are driven at rotational speed(s) to maintain the trees T in a substantially vertical position before and after the tree stems S have been cut from their respective tree trunks TT by a base cutter 150, to be hereinafter described.

Each harvesting head 120 has a base cutter 150, where a substantially horizontal circular saw 151 is mounted at the forward distal end of an elongate support plate 152 extending from the harvesting head 110 and is inclined to the horizontal at an angle of inclination equal to the angle of inclination of the rotational axes of the chipping drum 120 and nip rollers 131, 132. (Preferably the circular saw is downwardly inclined at an angle less than 5°, more preferably 1.5-2°, to the horizontal)

The circular saw 151 is driven by a hydrostatic motor (not shown) to sever the lower ends of the stems S of the trees T from their respective tree trunks TT; and the support plate 152 engages and supports the lower ends of the stems S to support and guide the stems S as the trees T are advanced (while maintained in a substantially vertical position) via the spirals 141-146 of the pick-up front 140 for engagement by the counter-rotating nip rollers 131, 132, and to be thereby fed downwardly to the chipper drum 120 to be converted into woodchips. The path of the trees T through the harvesting head 120 is illustrated by arrow "A" in FIG. 4.

A chip collector (not shown) is located below the chipper drum 121 and is arranged to receive the woodchips generated from the trees T. A conveyor, e.g., a pneumatic- or belt-conveyor, transports the woodchips to a hopper or bin, or directly to the out-loading conveyor.

As illustrated in FIGS. 6 and 7, the chipper drum 121 and nip rollers 131, 132 have their rotational axes inclined at an angle of 10° to the horizontal and also approximately 80° to the stems S of the trees T. As hereinbefore described, before and after the stems S are severed from their respective tree trunks TT, the spirals 141-146 of the pick-up front 140 and/or the nip rollers 131, 132 maintain the stems S in the substantially vertical position. Furthermore, the nip rollers 131, 132 maintain the stems S in that substantially vertical position, as they feed the stems S downwardly to, and rearwardly along, the chipper drum 121.

In the first embodiment illustrated in FIGS. 6 and 7, the horizontal feed velocity of the trees T is at "X" meters per second; where the vertical velocity of the tree stems S is at 101% of "X"; and the rearward velocity of the stems S along the chipper drum 121 is at 17% of "X".

It will be readily apparent to the skilled addressee that the horizontal feed velocity, and thereby the vertical velocity and rearward velocity, will be subject to variation, e.g., due to the angle of inclination of the chipper drum 121 and nip rollers 131, 132 to the horizontal and/or to the ground speed of the harvester 110.

The ground speed of the harvester 110 will be selected so that the trees T will be severed from their tree trunks TT and advanced via the pick-up front 140 to the nip rollers 131, 132, and thereby the chipper drum 121, for continuous harvesting of the trees T in row R; and where the capacity of the chipper drum 121 is never exceeded.

As the trees T are planted at selected spacing's along the rows R; and are preferably harvested every 2-6 years, the size of the trees T, and thereby the resultant woodchips obtained therefrom, will be relatively varied for each harvesting cycle.

In this embodiment, the pick-up front 140 has three pairs of counter-rotating spirals 141, 142; 143, 144; and 145, 146 which are of different lengths and of different vertical spacing's.

In this embodiment, the upper pair of spirals 141, 142 engage the foliage F of a tree T preferably just before the stem S is cut by the circular saw 151 of the base cutter 150, to assist in stabilizing of the tree T as the stem S is severed.

The lowermost pair of spirals 145, 146 then engages the stem S and co-operate with the upper pair of spirals 141, 142 to assist in maintaining the tree T in the substantially vertical position.

The intermediate pair of spirals 143, 144, which are shorter in length, both assist in maintaining the tree T substantially vertical and also assist in moving the tree T up the inclined support plate 152 for engagement by the nip rollers 131, 312.

The number of pairs of spirals; the vertical spacing's between pairs of spirals; and the horizontal spacing between spirals in a pair; may all be varied to suit the particular size and/or genus of tree T to be harvested.

In a modified version of the first embodiment, one spiral of each pair of spirals 141-146 may be replaced by an inclined guide rail, each spiral and guide rail pair forming an inlet passage for the harvester head 120.

The tree harvester 110 is particularly suitable for, but not limited to, harvesting trees of the small type such as those of the *Eucalyptus* and *Acacia* genera found in Australia. The harvester can also be used to harvest other genus of trees, having multiple stems, such as trees of the *Salix* and *Populus* genera indigenous to Europe and North America.

A second embodiment of the present invention will now be described, with reference to FIGS. 8 to 12, illustrating the conversion of the PRIOR ART harvester 10 (of FIGS. 1 to 3), to a tree harvester 210 in accordance with the present invention, together with the mode of operation thereof.

The tree harvester 210, converted from the PRIOR ART tree harvester 10, has a harvesting head 120 having a chipper drum 221, with chipper blades 230 operable to co-operate with the (inclined, substantially vertically) fixed anvil 222 to cut the stems S (and the foliage F) of the trees T into biomass as the harvester 210 advances along the row(s) R of the trees T.

In addition to the accelerator 233, within the biomass bin or hopper 231, a second, similar, accelerator 240 may be included intermediate the chipper drum 221 and the accelerator 233, to assist in the conveying the biomass from the chipper drum 221 to the outlet 212, and thereby the out-loading conveyor (not shown).

Figure 10:
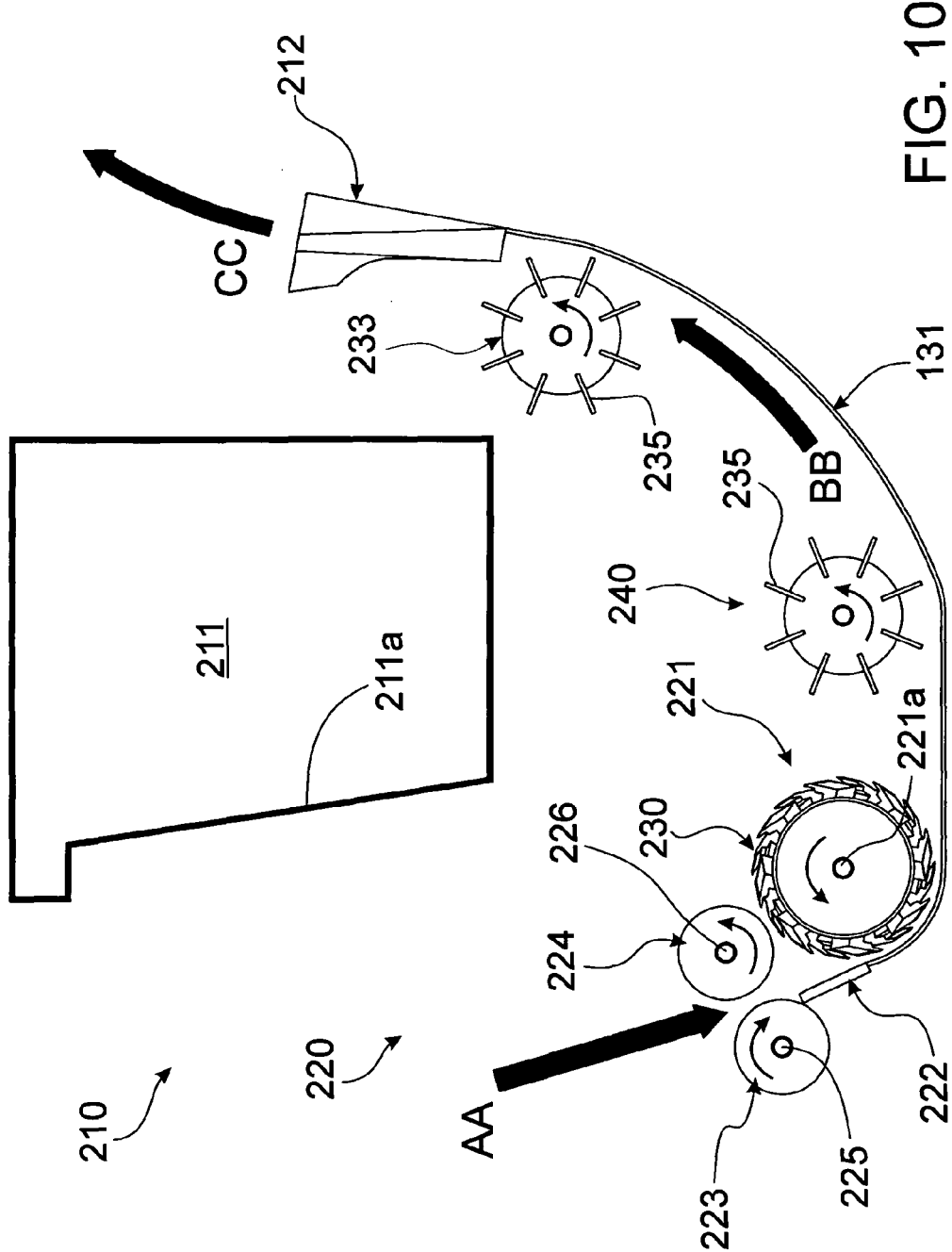
FIG. 10 is a schematic side view, on a larger scale, of the rearward portion of the harvesting head of the second embodiment (and showing the relative location thereto to the operator's cabin)

As shown in FIG. 10, the operator's cabin or station 211 is mounted above, but rearwardly of, the chipper drum 221, to enable substantially vertically trees to be guided into the chipper drum 221 as it converts the trees T, fed to it in the manner hereinafter described, into biomass.

The two pairs of feed rollers 23, 24 of the prior art harvester 10 are replaced by a pair of nip rollers 223, 224 which rotate about shafts 225, 226 which lie parallel to the shaft 221a of the chipper drum 221, with all three shafts 221a, 225, 226 transverse to the direction of travel of the harvester 210; and where the shaft 226 of the rearmost nip roller 224 is higher than the shaft 225 of the forward nip roller 223 of the pair.

Figure 8:
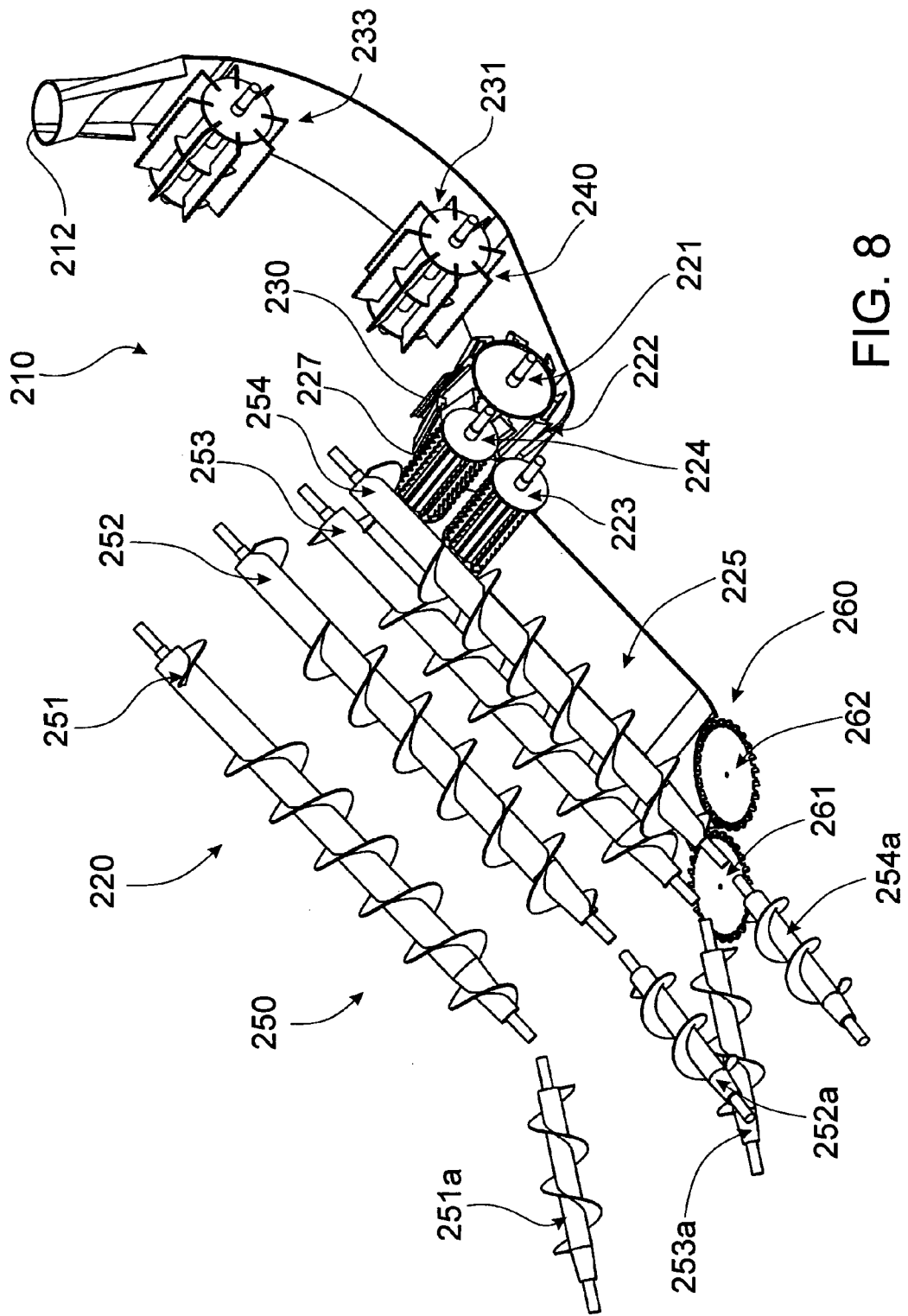
FIG. 8 is a schematic isometric view of the harvesting head of a second embodiment of the present invention (being produced by conversion of the PRIOR ART harvesting head of FIGS. 1 to 3)
Figure 9:
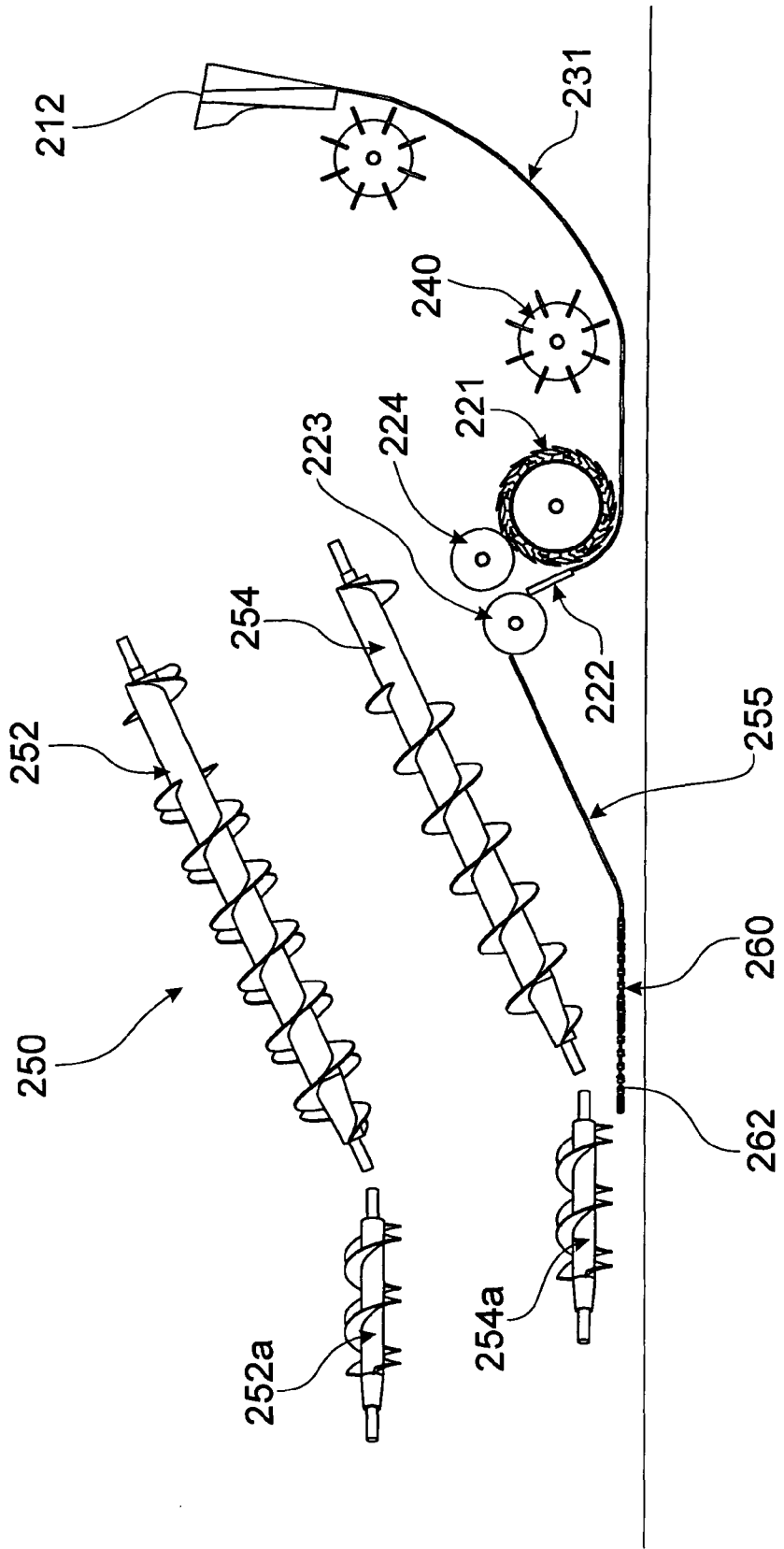
FIG. 9 is a schematic side view of the harvesting head of FIG. 8.
Figure 11:
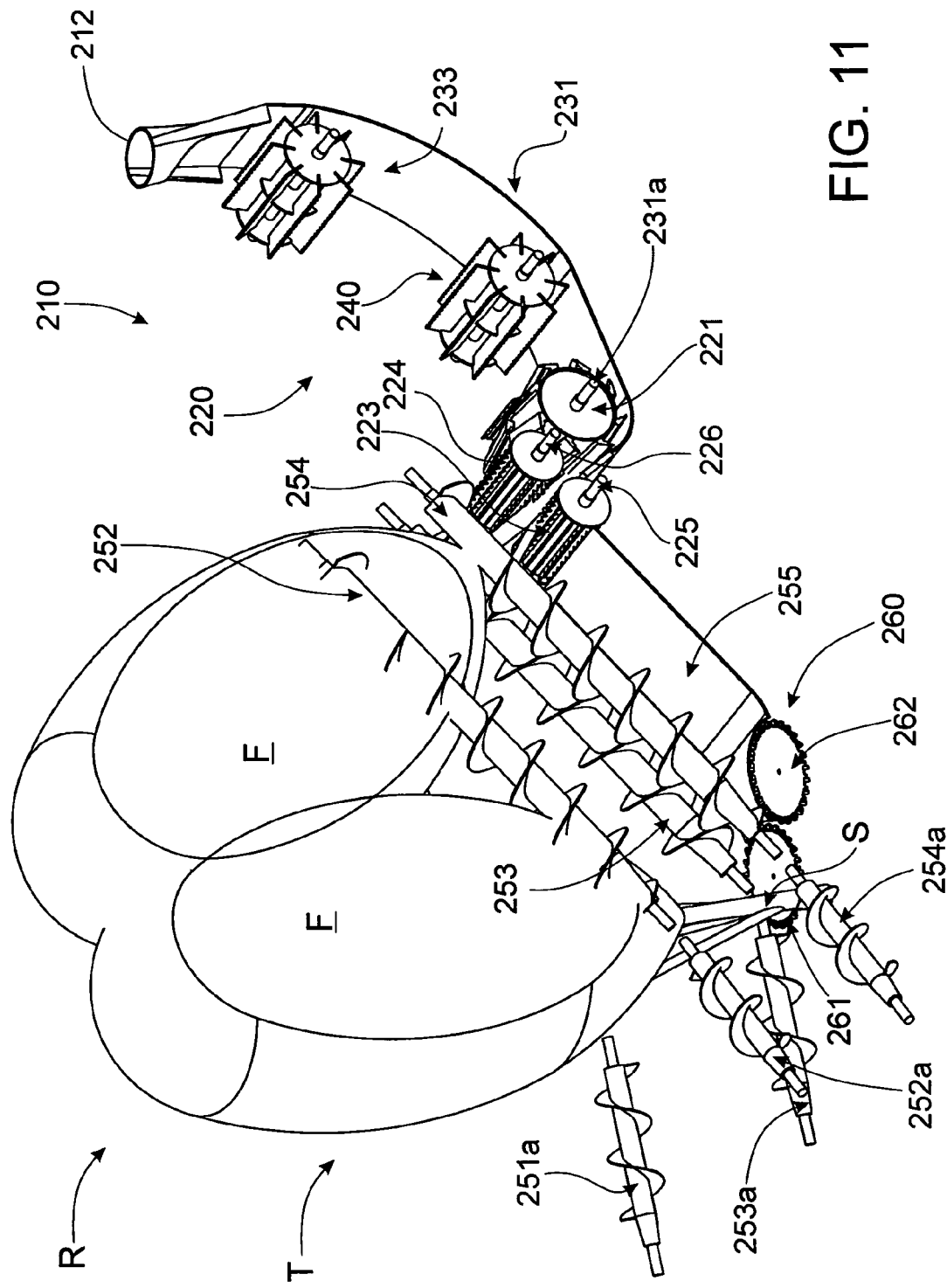
FIG. 11 is a schematic isometric view showing the harvesting head of the second embodiment, in operation, harvesting a row of trees.

As illustrated in FIGS. 8 and 11, both of the nip rollers 223, 224 have radially-extending "serrated" cleats 227, of the type herein before described with reference to the cleats 27, 28 for the pairs of feed rollers 23, 24.

A pick-up front 250 is provided above, and extends generally forwardly of, the pair of nip rollers 223, 224.

In this embodiment, the pick-up front 250 has two vertically spaced pairs of counter-rotating spirals 251, 252 and 253, 254.

The spirals 251-254 have their respective rotational axes inclined at the same angle to the horizontal as for the support plate 255, to be hereinafter described, and for the plane defined by the shafts 225, 226 of the nip rollers 223, 224.

The spirals 251-254 are driven at rotational speed(s) to maintain the trees T in a substantially vertical position before, and after, their stems S have been cut from their respective tree trunks TT, by a base cutter 260 to be hereinafter described.

The harvesting head 220 has a base cutter 260, where a single (not illustrated), or pair of substantially horizontal circular saw discs 261, 262 are mounted at the forward distal end of the elongate support plate 255, which extends from the harvesting head 220, and is inclined to the horizontal at an angle of inclination equal to the angle of inclination of the spirals 251-254, as hereinbefore described.

The circular saw discs 261, 262 are driven by hydrostatic motors (not shown), to sever the lower ends of the stems S of the trees T from their respective tree trunks TT; and the support plate 255 engages and supports the lower ends of the stems S to thereby support and guide the stems S as the trees T are advanced, and maintained in a substantially vertical position, by the spirals 251-254 of the pick-up front 250, for engagement by the counter-rotating nip rollers 223, 224; and then downwardly fed thereby to the chipper drum 221 (and anvil 222) to be converted into biomass.

Arrows AA; BB and CC respectively show the path of the stems S of the trees T to the nip rollers 223, 224 to the chipper drum 221; and then of the biomass, accelerated by the accelerators 240 and 233, to the outlet 212 and the out-loading conveyor (not shown).

Each of the spirals 251-254 may be provided with respective, substantially horizontal, but outwardly convergent, lead-in spirals 251a-254a, respectively, to assist in guiding the trees T into the pick-up front 250. It will be readily apparent to the skilled addressee that, if the spirals 251-254 directly drive the lead-in spirals 251a-254a e.g. via respective universal- or constant-velocity joints (not shown), the pitch of the helical flytes on the spirals 251-254 will be less than the pitch of the respective helical flytes on the lead-in spirals 251a-254a, so that the horizontal vector of the travel of the stems S of the trees T, relative to the spirals 251-254, 251a-254a, will generally match the travel speed of the harvester 210 (but in the opposite direction).

Figure 12:
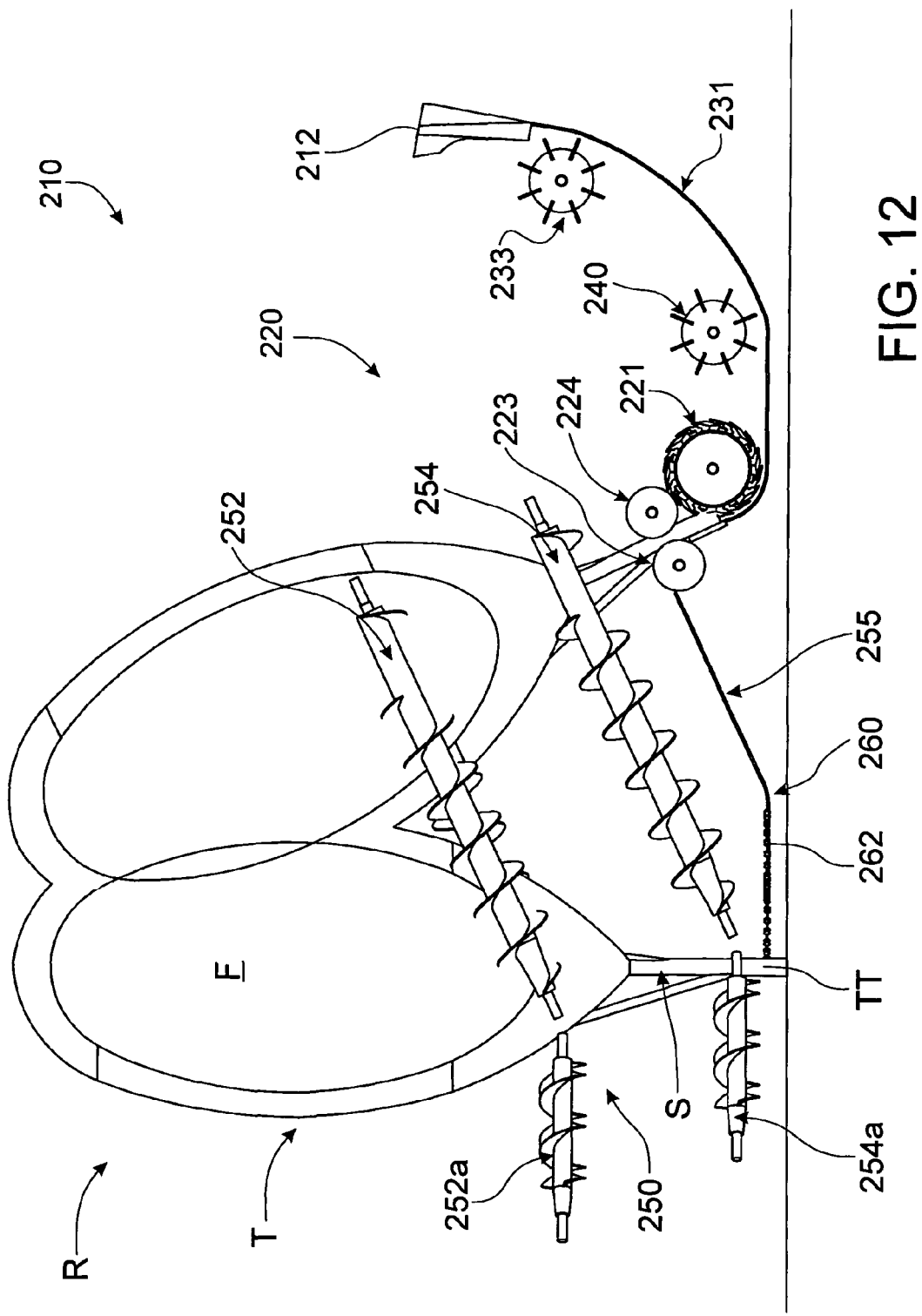
FIG. 12 is a schematic side view thereof, corresponding to FIG. 11.
Figure 13:
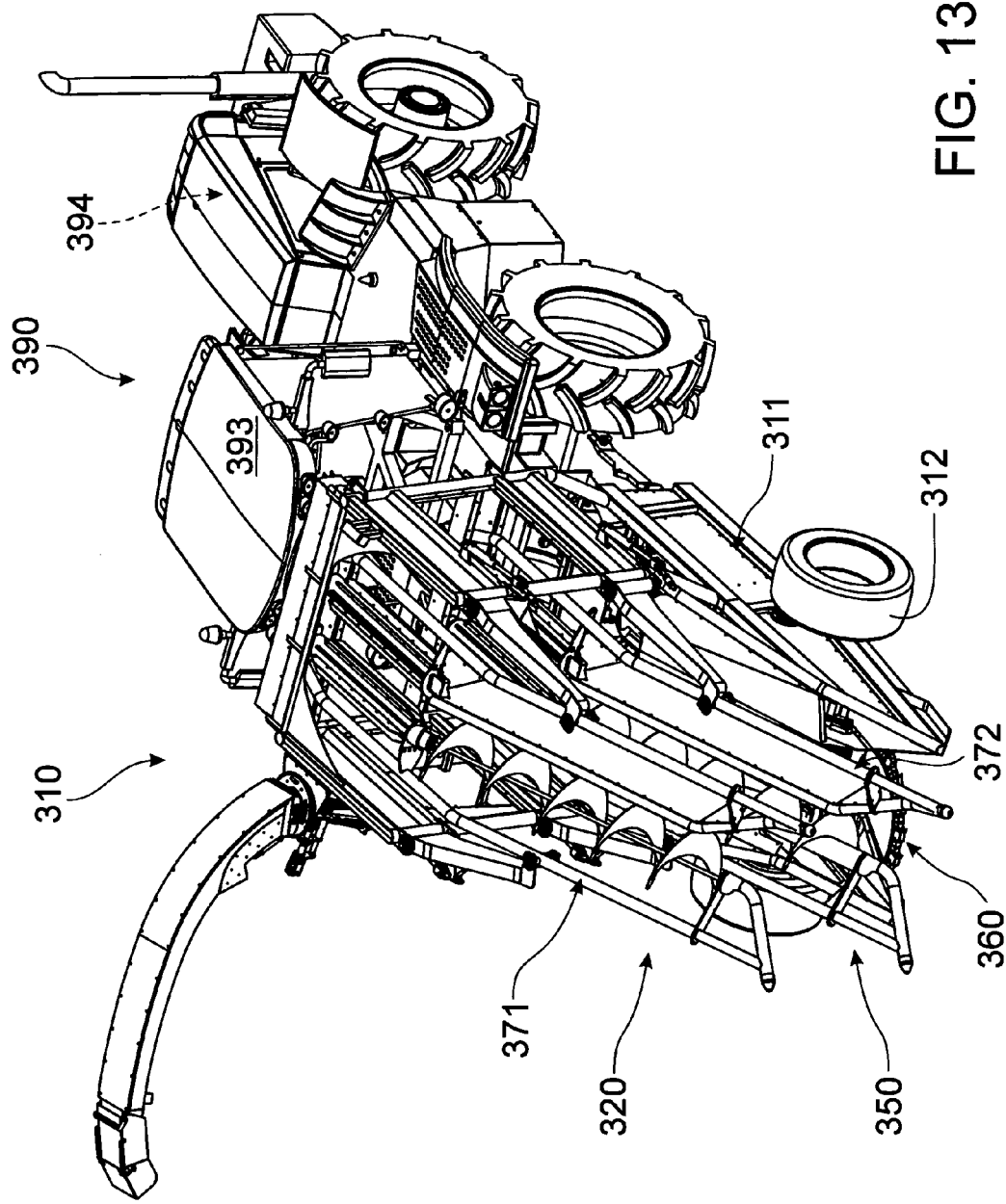
FIG. 13 is an isometric view, from the front, of a third embodiment of a tree harvester of the present invention.
Figure 14:
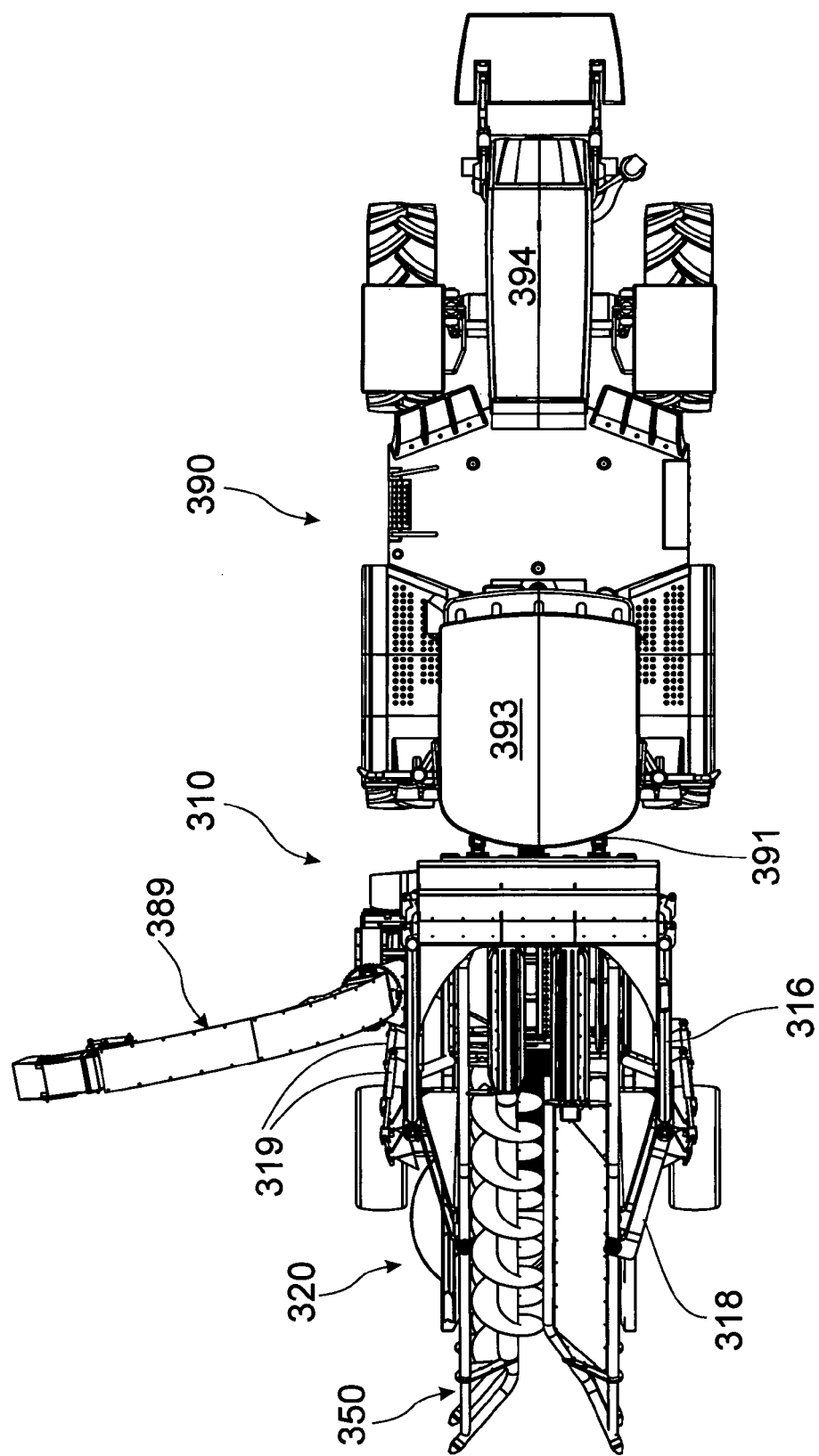
FIGS. 14 to 16 are respective top plan, side elevational and front elevational views corresponding to FIG. 13.
Figure 15:
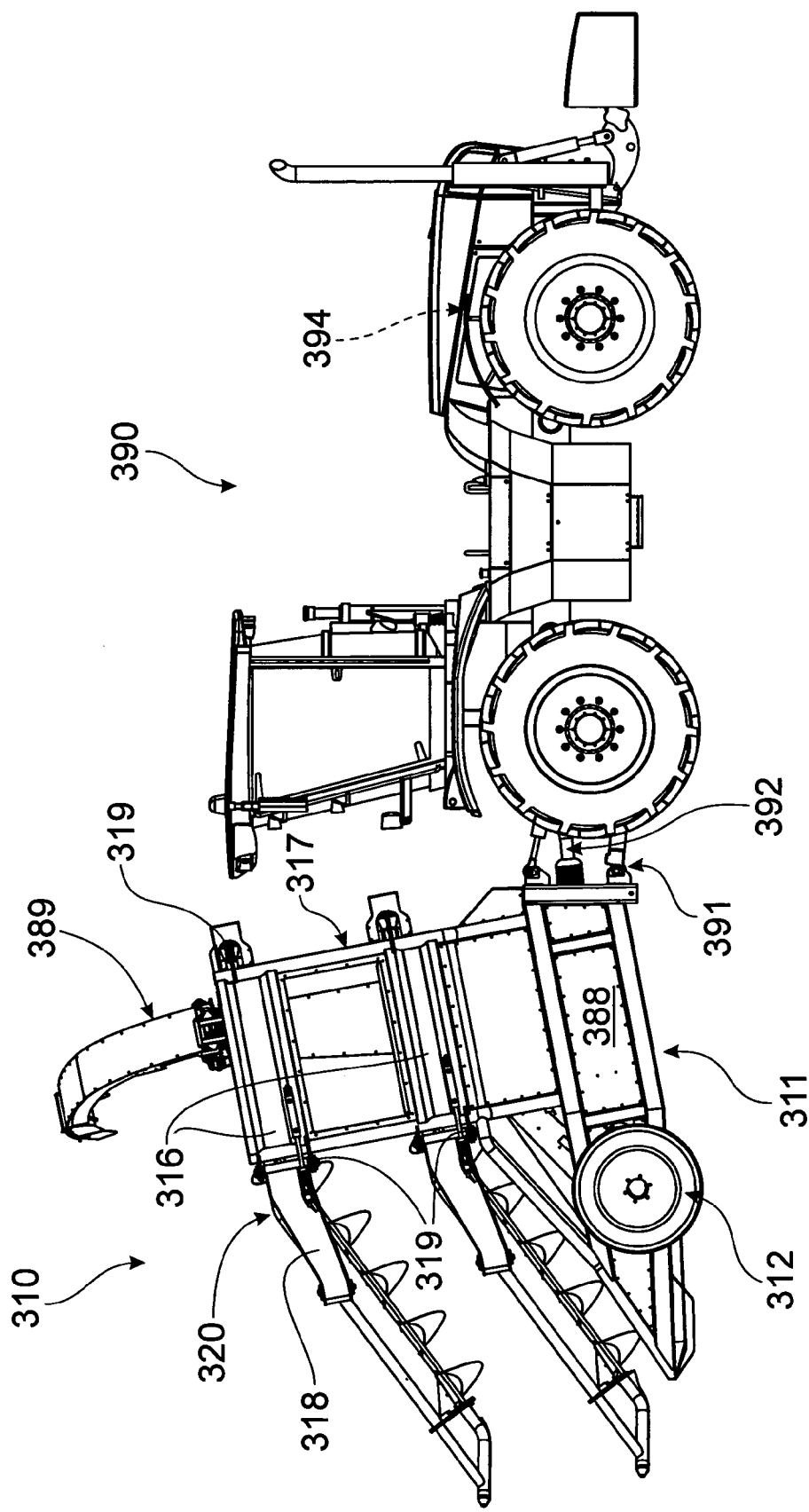
Figure 16:
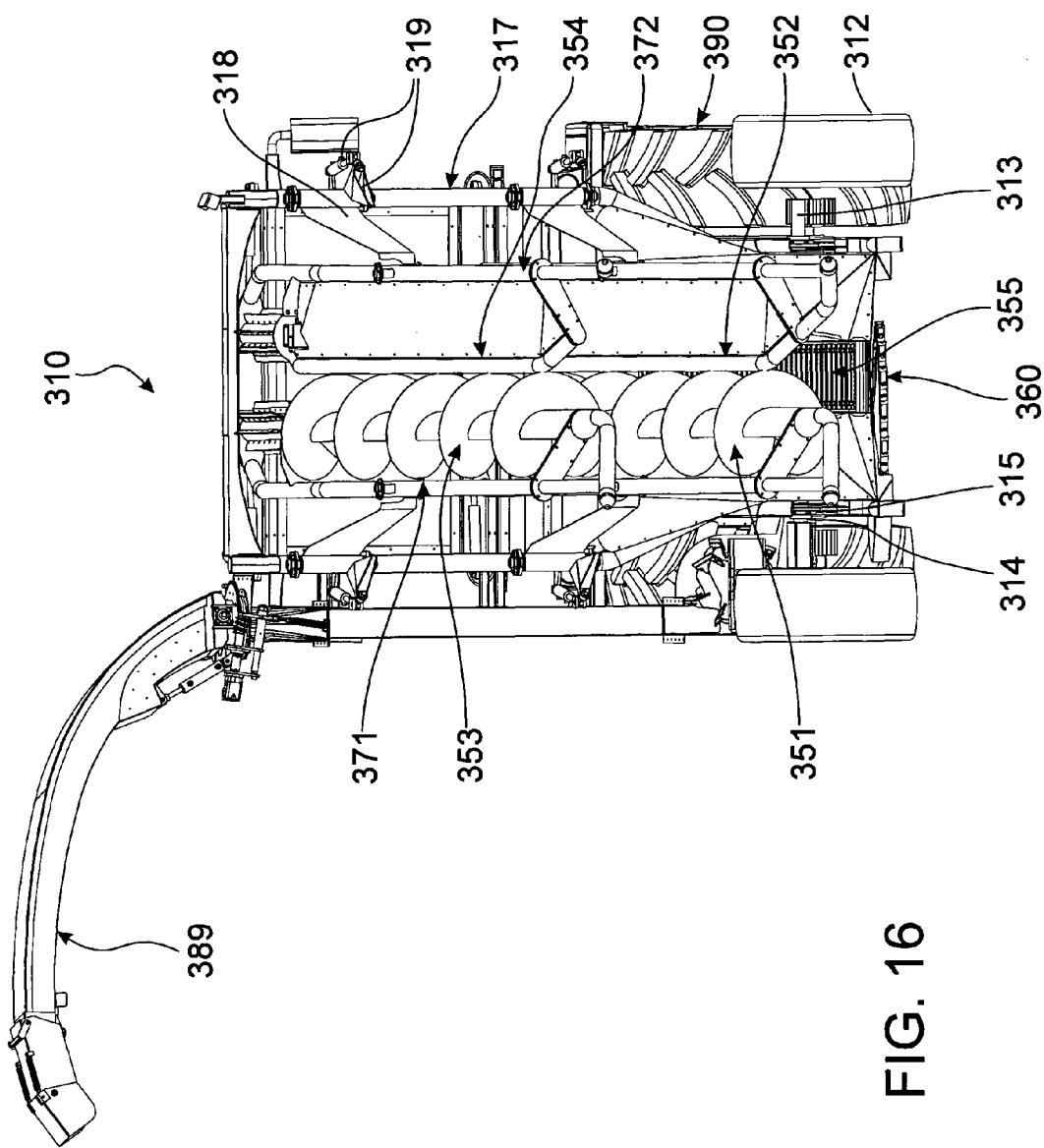
Figure 17:
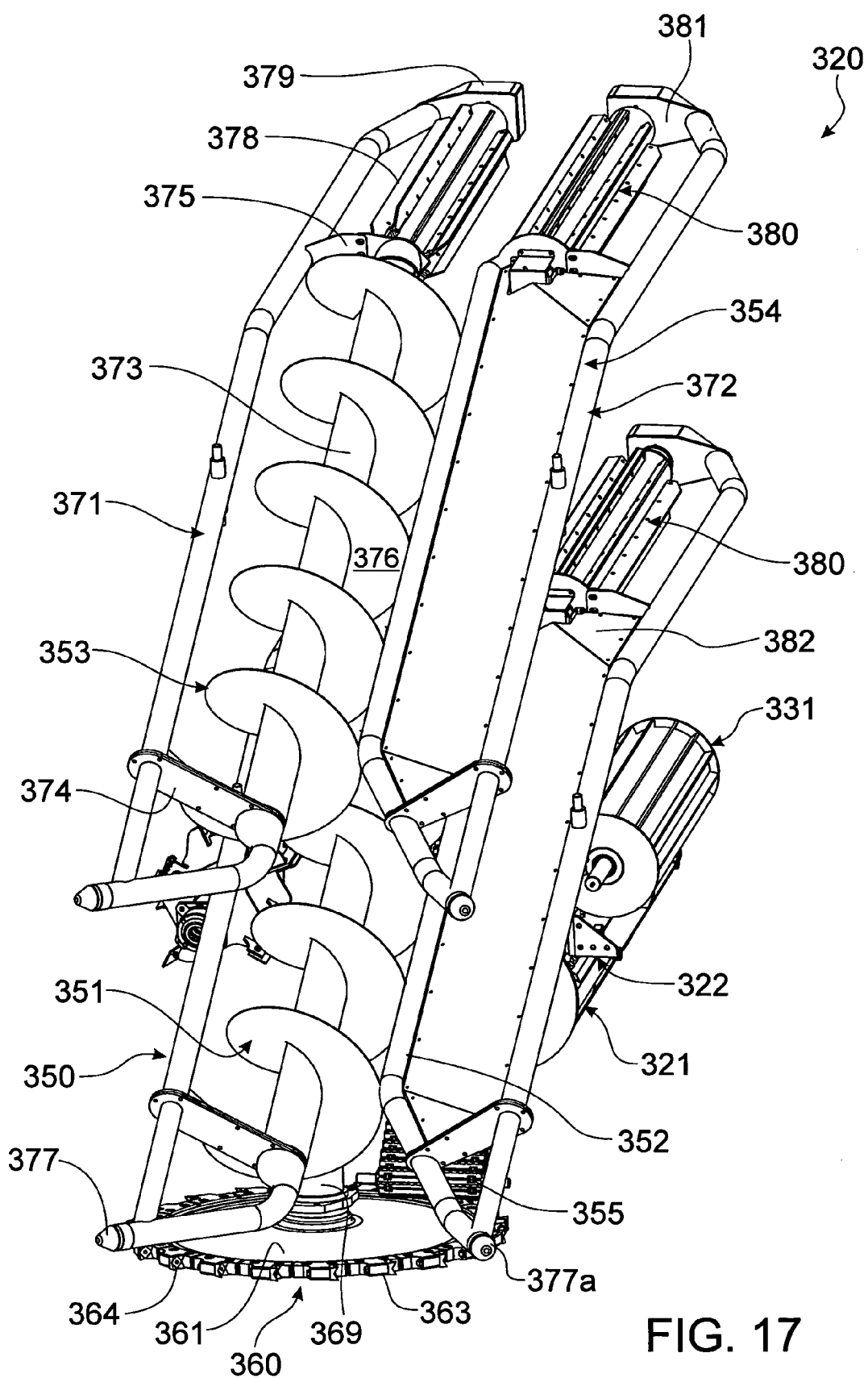
FIG. 17 is an isometric view of the harvesting head for the tree harvester of the third embodiment, parts be omitted for clarity.
Figure 18:
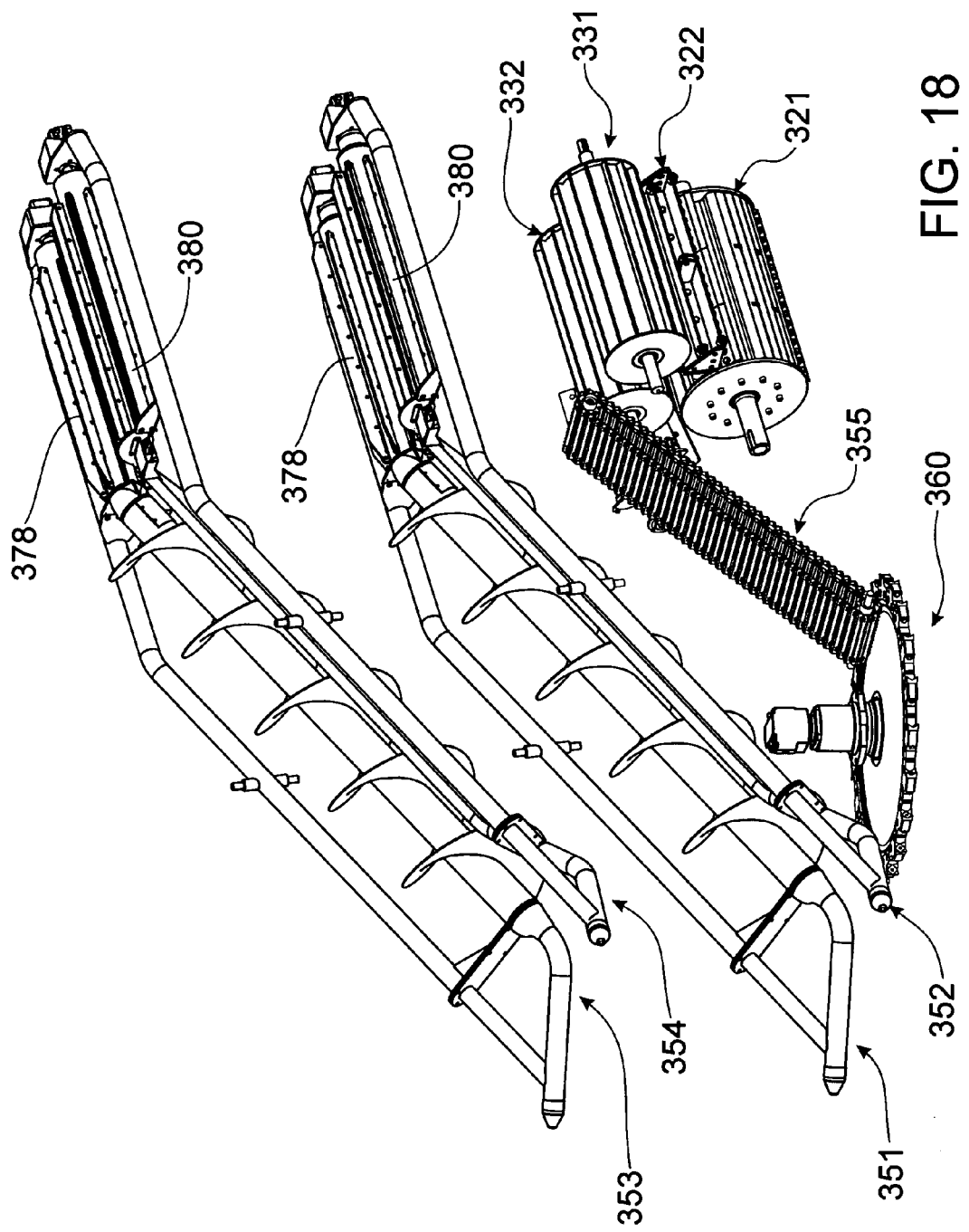
FIGS. 18 to 20 are similar views, taken from different points of view.
Figure 19:
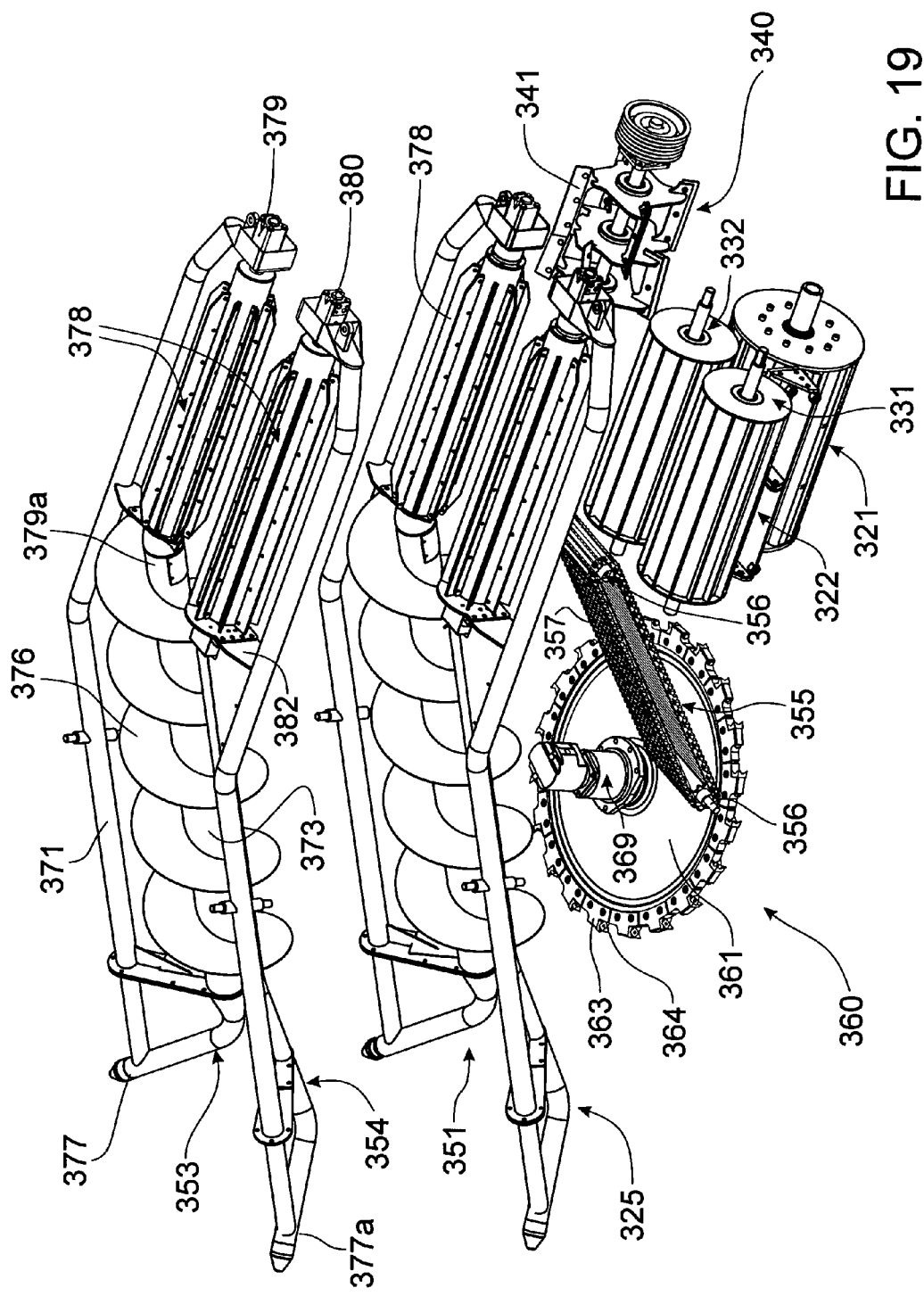
Figure 20:
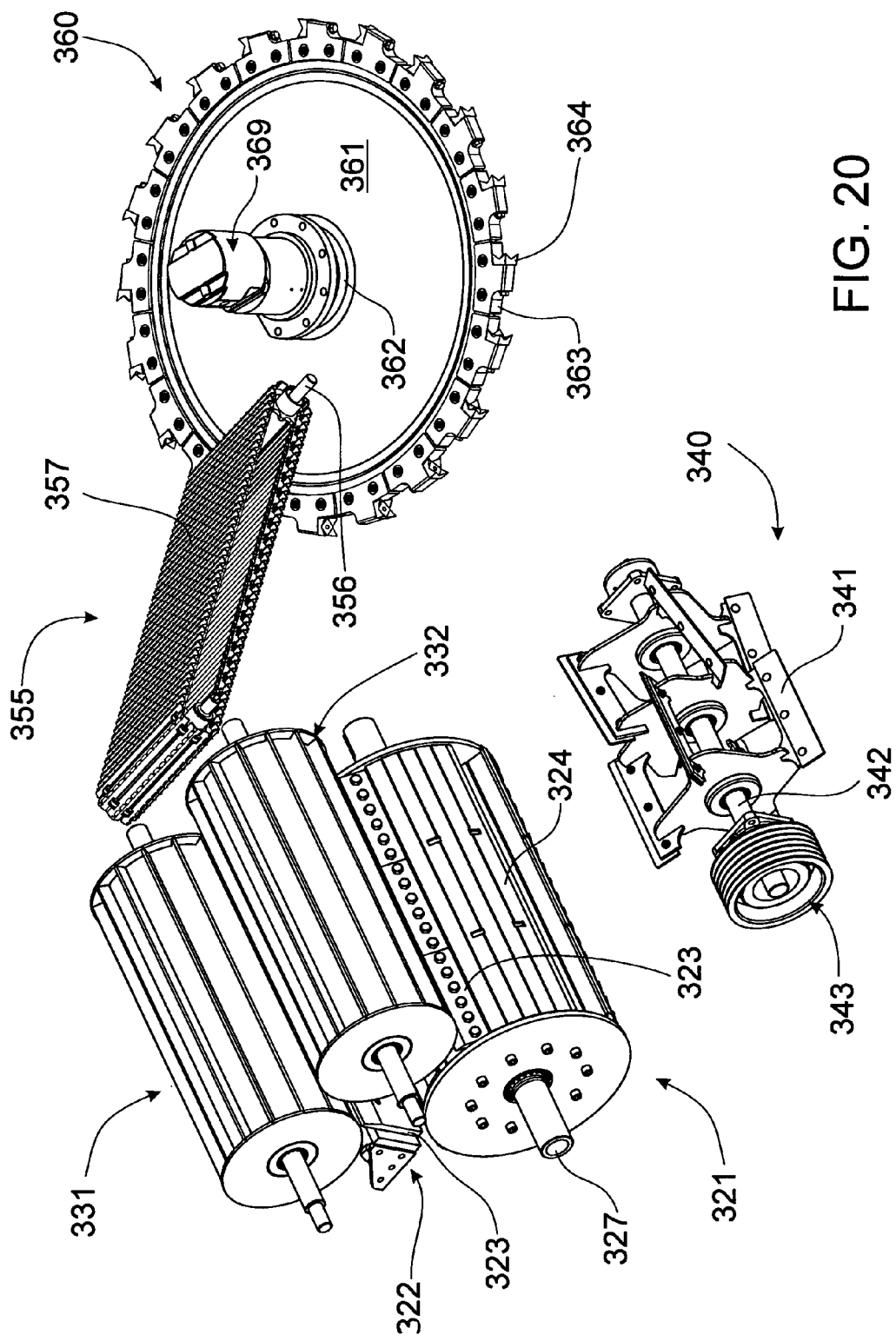

As is more clearly illustrated in FIGS. 11 and 12, the, or each, harvesting head 220, of the tree harvester 210, travels along a row R of trees T; and the stems S and foliage F of the trees T in the row(s) R are initially engaged by the lead-in spirals 251a-254a. The circular saw discs 261, 262, of the base cutter 260 cut the stems S of the trees T from their respective tree trunks TT; and the lower ends of the stems S are supported by the support plate 25, as the trees T are moved rearwardly towards the chipper drum 21 by the spirals 251-254.

The trees T are maintained in a substantially vertical position as they move towards the nip rollers 223, 224; where they may be inclined at a small angle from the vertical to enable the stems S to be engaged by the nip rollers 223, 224, and so enable the trees T to be advanced stem S first towards the chipper drum 121, in the direction of arrow AA shown in FIG. 10.

The ground speed of the harvester 210 will be selected so that the trees T will be severed from their tree trunks TT, and advanced by the pick-up front 250 to the nip rollers 223, 224; and thereby the chipper drum 221, for continuous harvesting of the trees T in row R, while ensuring the capacity of the chipper drum 221 is not exceeded.

Sensors, not shown, in the harvesting head 220, can detect the presence of debris (e.g. stones, metal pieces) which could damage the harvester 210 and/or if the chipper drum 221 has become "choked", & warning signal(s) can be transmitter to the operator's cabin or station 211.

While the tree harvester 210 has been described with respect to a single harvesting head 220, it will be readily apparent to the skilled addressee that two or more similar harvesting heads 220 can be fitted to the tree harvester 210, where each harvesting head 220 harvests the trees T in respective rows R.

It will also be readily apparent to the skilled addressee that additional pairs of spirals (and/or lead-in spirals) may be mounted above the spirals 251-254 (and/or 251a-254a) to assist in maintaining the trees T in the substantially upright position as they are advanced to, engaged with, and fed to, the chipper drum 221, by the nip rollers 223, 224. (If required, two pairs of superimposed nip rollers may be provided.)

The skilled addressee will appreciate that this embodiment of the present invention enables the conversion of an existing PRIOR ART harvester 10, using as many of the existing components as possible, to a tree harvester 210, which is capable of harvesting "small" trees.

FIGS. 13 to 24 illustrate a third embodiment of a tree harvester 310 in accordance with the present invention.

The harvester 310 has a single-row harvesting head 320, mounted on a harvester chassis 311 provided with ground engaging tyre/wheel assemblies 312, which are selectively height adjustable to enable the cutting height of the base cutter 360 (to be hereinafter described in more detail) to be selectively adjusted.

The harvester chassis 311 is releasably connectable to the prime mover 390, being a 4-wheel-drive (4WD) tractor 390, provided with a 3-point linkage assembly 391 and power-take-off (P.T.O.) drive output 392. The 3-point linkage 391 is releasably connectable to suitable mounting lugs on the harvester chassis 311; and the P.T.O. drive output 392 is selectively connectable to a P.T.O. drive shaft (to be hereinafter described) on the harvester 310.

The selection of a particular "off-the-shelf" tractor 390, as a suitable prime mover, will depend on a number of factors, including:

a) the terrain, including soil types, in which the trees are growing;

b) the overall weight of the tree harvester;

c) the power input requirements for the various components on the tree harvester 310, which are preferably operated within small speed variations;

d) the total power required to advance the tree harvester 310 (and tractor 390) along the rows of trees at the optimal harvesting speed; and e) the capital- and operating-costs of the tractor 390.

To minimise the capital cost, and maximize the utility of the tractor 390, it is preferred that the tree harvester 310 can be releasably connected to the tractor 390 only when the trees are to be harvested; and not form an integral part of a specialist-harvester which is not utilized at other times. Suitable "off-the-shelf" tractors (or other prime mover vehicles) are sold under trade marks such as "CLAAS", "JOHN DEERE" and "MASSEY FERGUSON".

The hydraulic circuits on the tree harvester 310 are connected to control valves provided within the operator's cabin 393; while the P.T.O. drive output 392 is connected to the diesel engine 394 which powers the tractor 390.

To enable the cutting height of the base cutter 360 to be selectively adjusted, the tyre/wheel assemblies 312 may be mounted on respective axles 313 carried at the forward ends of leading suspension arms 314 pivotally mounted on the harvester chassis 311 and selectively raised and lowered by respective hydraulic rams 315.

FIGS. 17 to 21 illustrate "exploded" views of the harvester head 320 of the tree harvester 310, where parts of the harvester head 320 have been omitted for clarity.

As hereinbefore described, the chipper drum 321 and the pair of nip rollers 331, 332 have their respective axles journalled on the harvester chassis 311 with their rotational axes parallel to the longitudinal axis of the harvester head 320. (The chipper drum 321, and the drive system therefor, will be hereinafter described in more detail with reference to FIGS. 22 to 24.)

The anvil 322 for the chipper drum 321 is mounted below the nip roller 331 and has an anvil blade 323 arranged to co-operate with the chipper drum 321.

The base cutter 360 is powered by a heavy duty hydraulic motor 369 with its axis inclined at a small angle, e.g., 1.5-2° from the vertical, and is bolted to a concave hub at the centre of the saw disc 361. A plurality of saw teeth 363, eg., with tungsten carbide cutting tips 364 are releasably bolted to the periphery of the saw disc 361 and are arranged to cut the stems of the tree just above ground level, eg., at a height of 10-50 mm.

The base cutter 360 has a relatively large mass, so that it will have a high momentum of inertia and will substantially maintain its rotational speed as the stems of the trees are cut. As the base cutter 360 should preferably engage each tree stem at its maximum rotational speed, any loss must be overcome before the subsequent tree in the row is engaged; and any loss in rotational speed during the cutting of each tree should preferably not exceed 95% (and any reduction in that loss is of advantage).

A continuous chain-link conveyor 355 supports the lower ends of the stems of the trees as they are conveyed from the base cutter 360 to the nip rollers 331, 332. The conveyor 355 has head and tail shafts 356 which are transverse to the longitudinal axis of the harvester head 330 and which provide an rearwardly/upwardly inclined top run 357 to support the lower ends of the stems.

The pick-up front 350 has a pair of vertically spaced spiral and guide bar pairs 351, 352 and 353, 354 which provide an inlet path for the trees to the harvester 310. As illustrated in FIGS. 13 to 16, the spiral and guide bar pairs are mounted on the harvester chassis 311 via a pair of arms 316 which extend forwardly from stanchions 317 rotatably mounted on the harvester chassis 311. The arms 316 have links 318 pivotally mounted thereon, and extending forwardly therefrom, which are hingedly connected intermediate the lengths of support tubes 371, 372 for the spiral and guide rail assemblies. The trailing ends of the support tubes 371, 372 are hingedly mounted to the harvester chassis 314 inboard of the stanchions 317, and hydraulic rams 319 urge the arms 316 and links 318 inwardly and oppose any forces trying to increase distance between each spiral 351, 352 and its adjacent guide bar 352, 354.

Each spiral 351, 353 has a shaft or tubular hub 373 rotatably journalled on support brackets 374, 375 on the support tube 371 and has a helical flyte 376 around the tubular hub 373. A guide extension 377 co-operates with a similar guide extension 377a on the support bar 372 for each guide bar 352, 354 to form a convergent mouth to the inlet passage.

Figure 21:
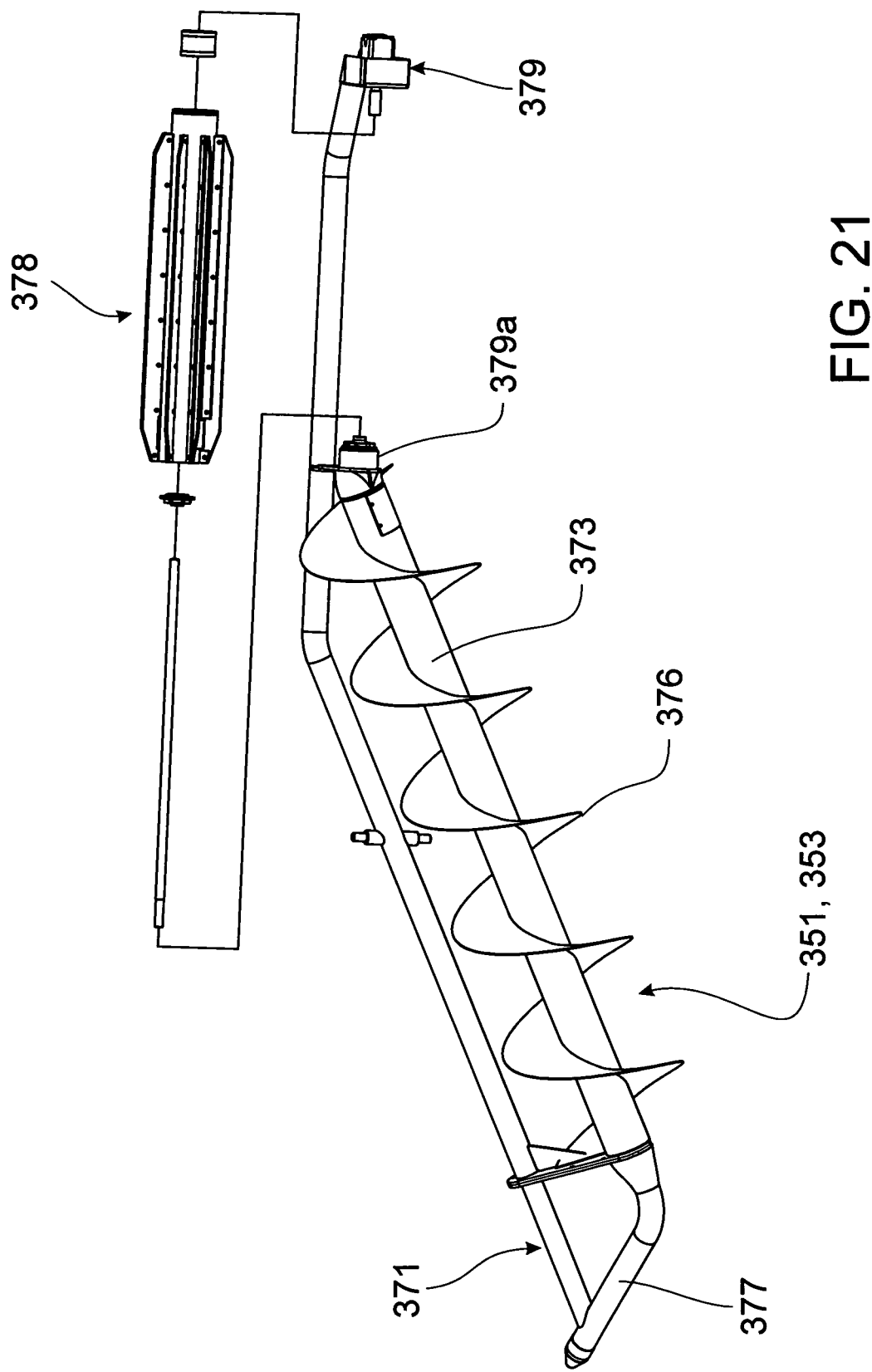
FIG. 21 is an (exploded) schematic side view of a spiral/nip roller assembly.

A nip roller 378 is operably connected between a hydraulic drive motor 379 and an angled drive gearbox 380 mounted on the bracket 375, and is operably connected to the tubular hub 373. (As shown in FIG. 21, the rotational axis of the nip roller 378 is parallel to the longitudinal axis 320 of the harvester head and lies substantially horizontally during normal operation of the harvester 310.)

The guide bars 352, 354 have a similar, but counter-rotating, nip roller 380 driven by a respective hydraulic motor 381 and rotationally mounted on an inwardly-directed bracket 382 on the support bars 372 for the guide bars 352, 354.

In a preferred embodiment of the harvester 310, the pick-up front 350 has a pair of vertically-spaced spiral and guide bar pairs; but it will be apparent to the skilled addressee that only a single spiral and guide rail pair; or three or more such pairs; may be provided, depending on the nature of the trees to be harvested.

In addition, as the respective spiral and guide bar pairs 351, 352, 353, 354 are independently mounted on the harvester chassis 311, they can accommodate trees, and in particular, foliage, of different shapes and widths.

An accelerator 340 is mounted below the chipper drum 321 and has a plurality of radial cleats 341 which convey the biomass from the hopper 388 below the chipper drum 321 to the out-take chute 389 which is pivotally mounted on the harvester chassis 311.

The input shaft 342 of the accelerator 340 is driven by a driven pulley 343 connected via belts (not shown) connected to a driving pulley 344 on the drive system for the chipper drum 321 to be hereinafter described.

Figure 22:
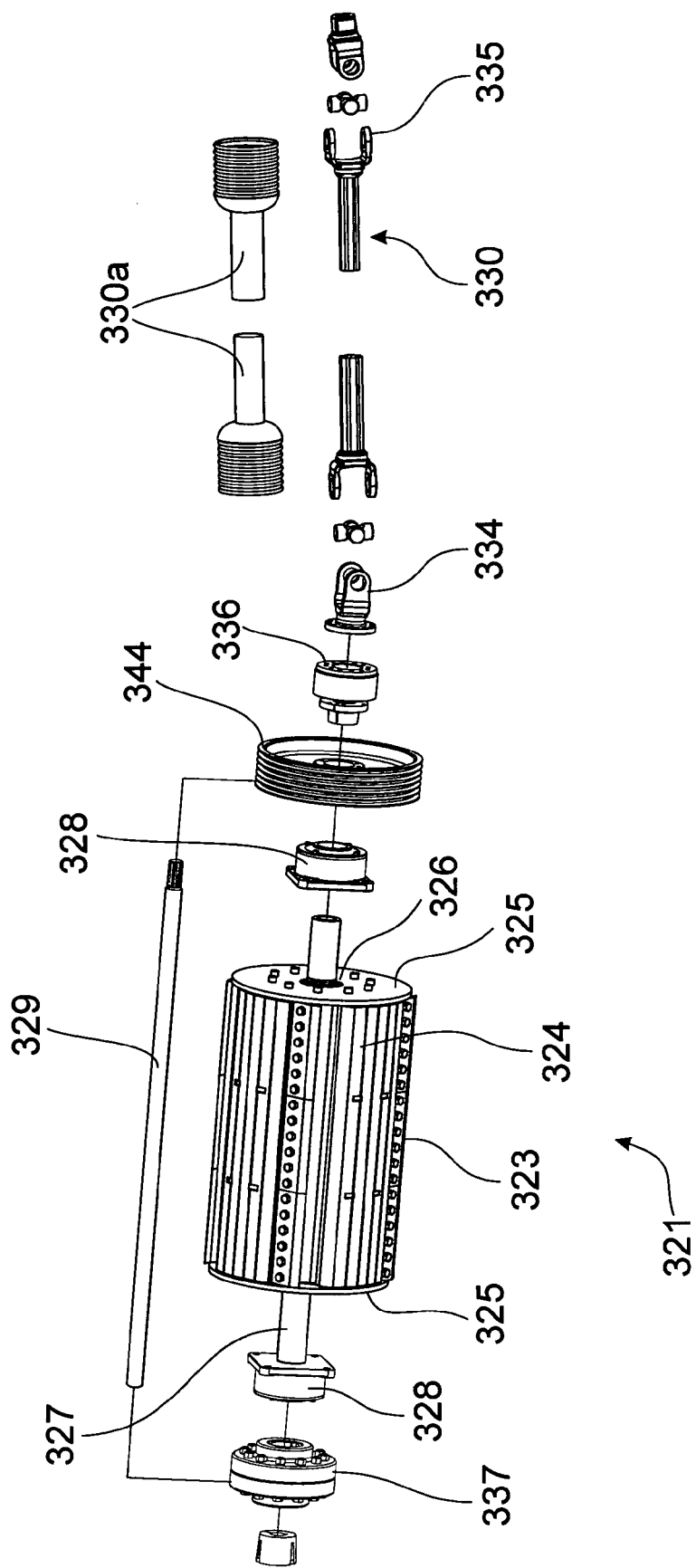
FIG. 22 is an exploded side view showing the drive for the chipper drum.
Figure 24:
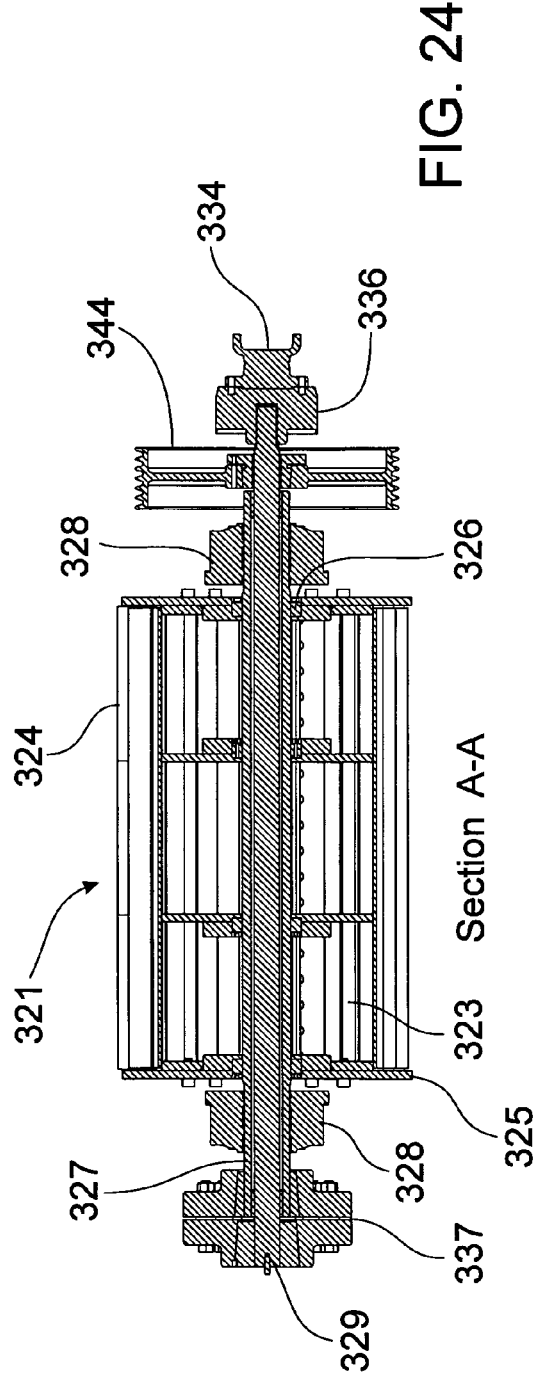
FIG. 24 is a sectional side view taken on line "A-A" on FIG. 23.
Figure 23:
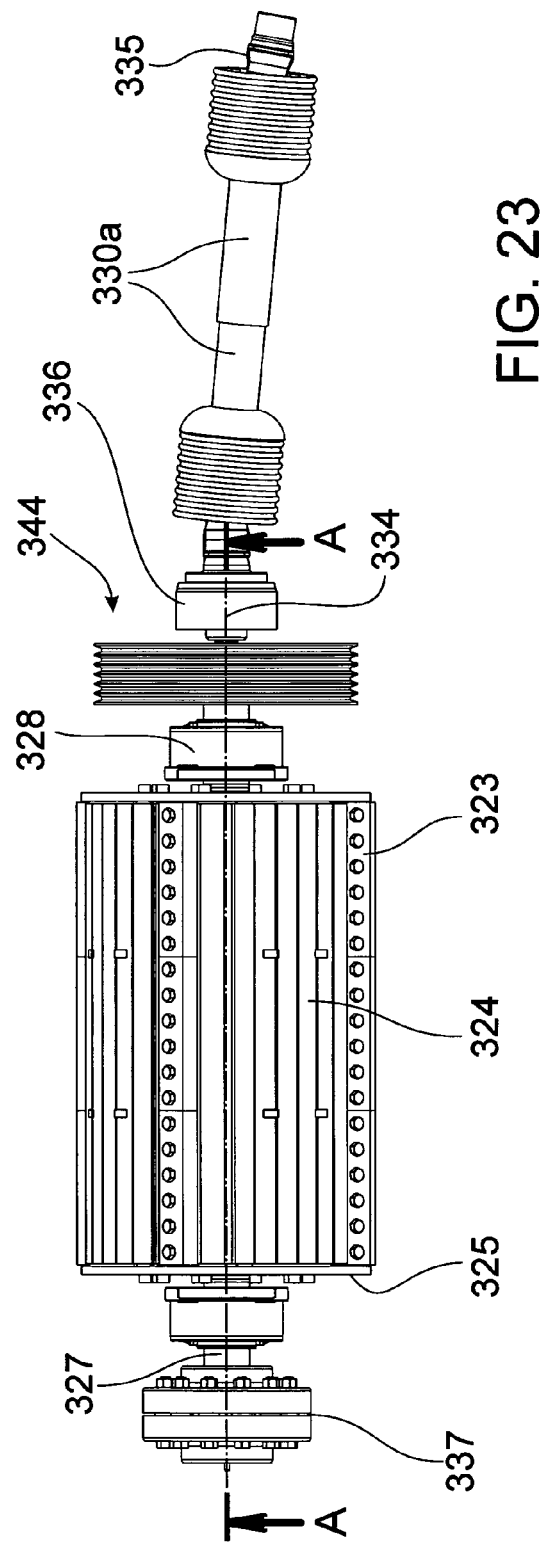
FIG. 23 is an assembled side view corresponding to FIG. 22.

Referring to FIGS. 22 to 24, the chipper drum 321 has a plurality of substantially L-section cutting blades 323 releasably mountable on respective support bars 324 interconnecting annular end plates 325 for the drum. The end plates 325 have hubs 326 fixed to a tubular drive shaft 327 rotatably journalled in bearing assemblies 328 mounted on the harvester chassis 311. A solid driving shaft 329 is received within the tubular drive shaft 327 with a small running clearance and has its input end connected to a P.T.O. drive shaft 330 by a yoke assembly 334; the drive 330 connected by a yoke assembly 335 to the P.T.O. output shaft 392 on the tractor 390. Safety tubes 330a are provided around the P.T.O. drive shaft 330 and the respective yoke assemblies 334, 335.

A torsion-damping coupling 336 is provided intermediate the yoke assembly 334 and the input end of the solid driving shaft 329; and a second torsion-damping 337 is provided to interconnect the co-axial solid driving and the drive shafts 329, 327 at the other end of the chipper drum 321. The torsion-damping couplings 336, 337 are designed to absorb the shock loads applied to the chipper drum 321 as the trees are converted to biomass, whilst allowing the P.T.O. drive shaft 330 connecting the harvester 310 to the tractor 390 to run at a substantially constant speed. The torsion-damping couplings 336, 337 may allow the chipper drum 321 to "lag" the P.T.O. drive shaft 330 by up to 6° of rotation; but enable the chipper drum 321 to "come into phase" with the P.T.O. drive shaft 330 and achieve its full rotational speed before the next tree is fed thereto by the nip rollers 331, 332. Preferably, the chipper drum 321 never falls below 98% of its optimal operating speed.

A driving pulley 344 on the driving shaft 329 is connected by belts (not shown) to the driven 343 pulley on the accelerator 340 as hereinbefore described.

As previously stated, to minimize capital costs, and to enable the prime mover to be used for other purposes outside the harvesting period, it is preferred that the tree harvester is provided as a unit mountable on an existing prime mover.

Figure 25:
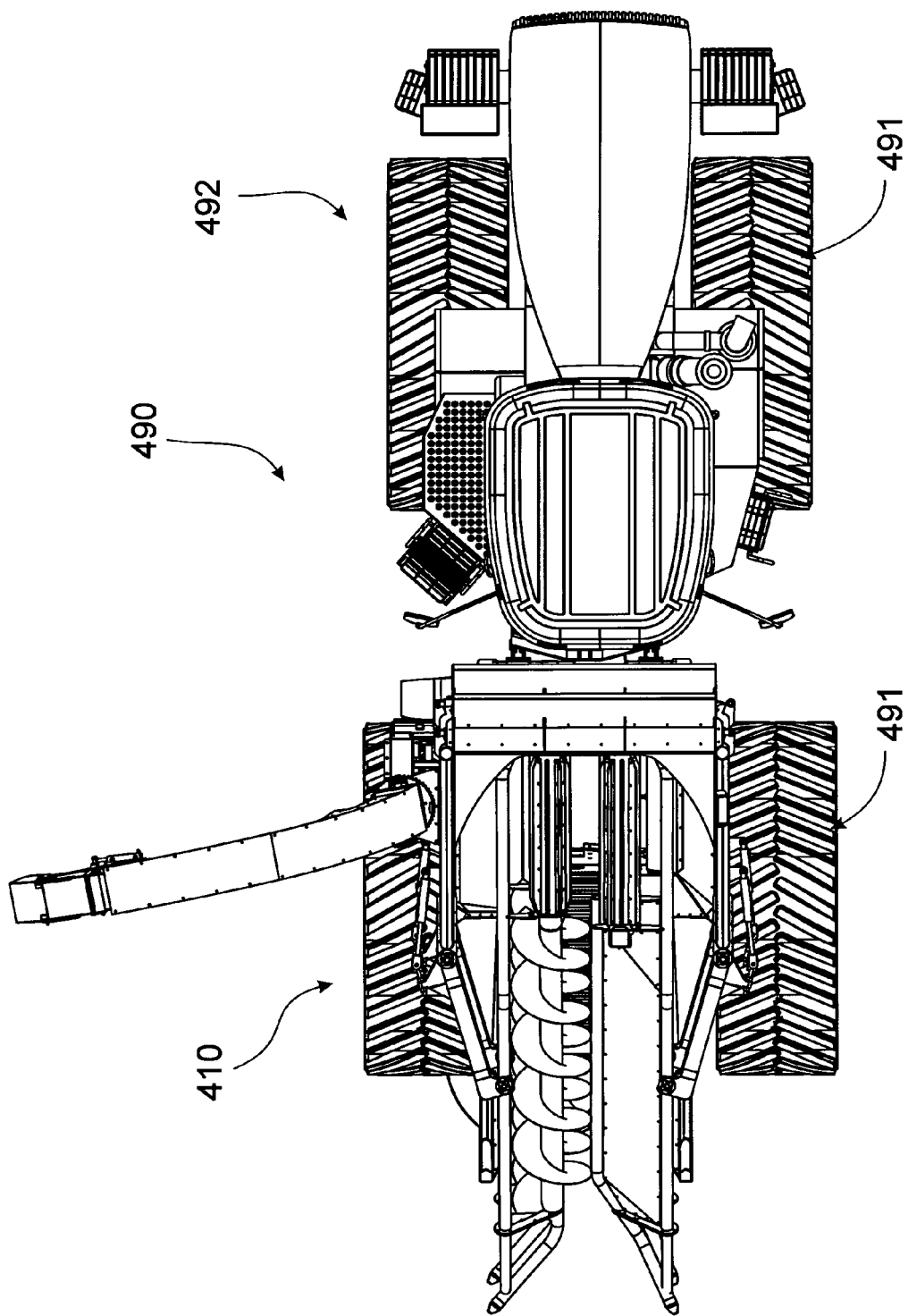
FIGS. 25 and 26 are respective top plan and side elevational views of the tree harvester of the third embodiment mounted on an articulated prime-mover.
Figure 26:
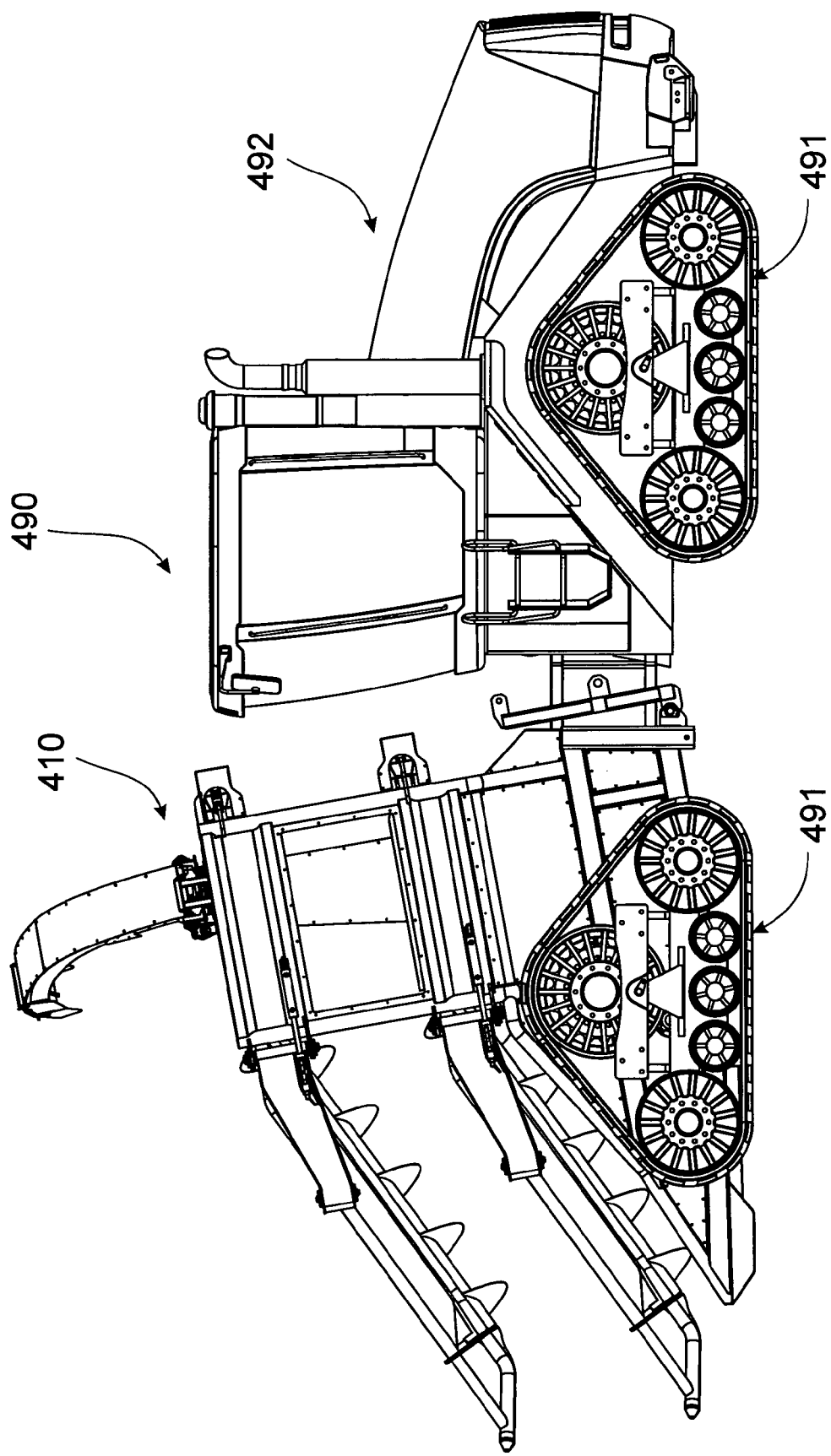

FIGS. 25 and 26, however, illustrate a fourth embodiment of the harvester 410 where the tree harvester 410 is provided as one portion of an articulated vehicle 490 supported on continuous tracks 491, the other portion 492 of the articulated vehicle 490 providing the prime mover.

In this embodiment, the continuous tracks 491, which may be formed of rubber loops or track links, are preferred where the soil is of low mechanical strength, and the prime mover 490 and harvester 410 must have a low footprint pressure.

It will be readily appreciated by the skilled addressee that when the harvester 410 is not required, the harvester 410 may be disconnected from the other portion 492 of the articulated vehicle 490 and replaced with a different vehicle portion.

Figure 27:
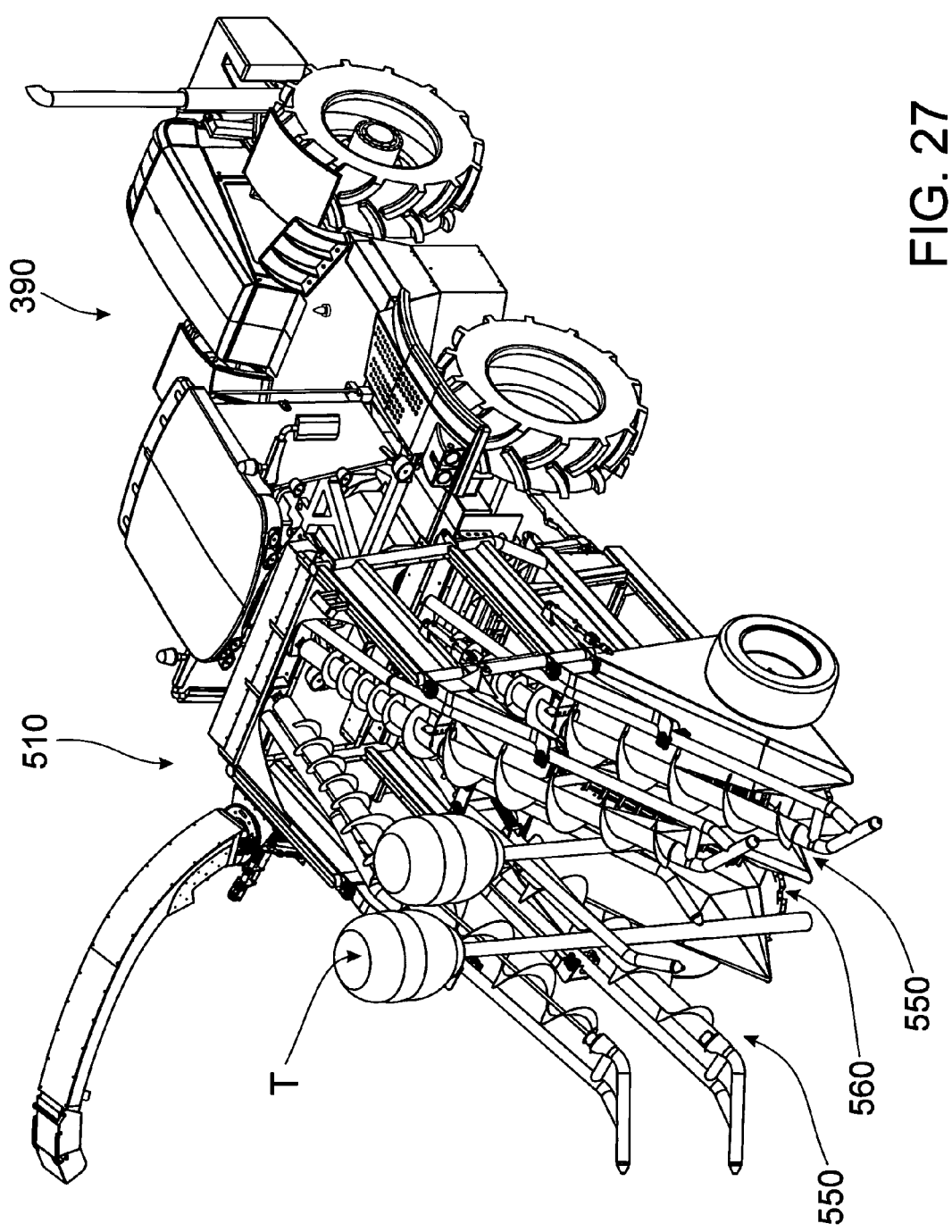
FIGS. 27 and 28 are respective isometric and front elevational views of a two-row harvester, of a fourth embodiment, of the present invention.
Figure 28:
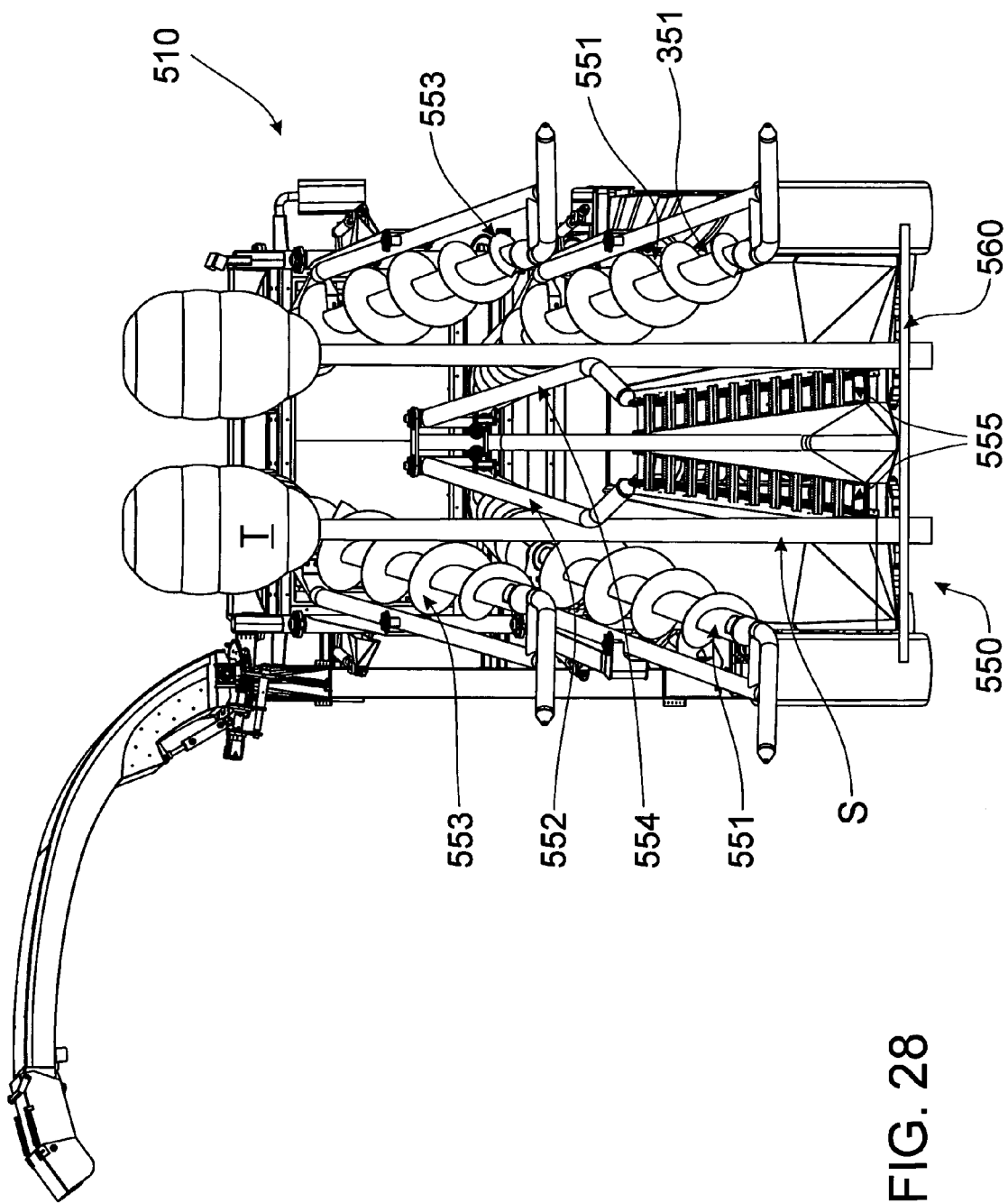

In the fifth embodiment illustrated in FIGS. 27 and 28, the harvester 510 is a twin row harvester mounted on a tractor 390 corresponding to the tractor 390 of the third embodiment.

The harvester 510 is arranged as a "mirror-image" along its central axis, with the guide bars 552, 554 for the respective pick-up fronts 550 preferably located along the inner sides of the inlet passages; and the respective spirals 551, 553 for the spiral and guide rail pairs provided along the outer sides of the harvester 510. A respective base cutter 560, as hereinbefore described, and conveyor 555, is provided for each row of trees T to be harvested; and the spiral and guide rail pairs can swing transversely relative to the centre line of the harvester 510 to accommodate any variations in the distance between the rows R of the trees T.

The operation of this harvester 510 for each row of trees T will be as hereinbefore described with reference to the third embodiment of FIGS. 13 to 24.

The harvesters, in accordance with the five embodiments of the present invention hereinbefore described, are designed to harvest the trees T every 2-6 years, more preferably every 4 years; where the trees T are preferably spaced 2-2.5 meters apart along the rows R; and with a preferable lateral spacing of 2-4 meters between adjacent rows R. The harvesters are designed to harvest single rows R of trees of the *Eucalyptus* genus, having a stem diameter up to 150 mm (or up to 200 mm for the *Blue gum* species); and two rows R of trees of the *Casuarinas* species, having stem diameters up to 150 mm.

To enable efficient harvesting of the trees, it is preferred that the prime mover has an engine with sufficient power to ensure that the engine speed does not dropped by more than 10-15% while the trees are cut and chipped; that the chipping drum speed does not vary by more than 2%; and the that the speed of the saws does not vary by more than 5%. If the engine speed varies too much, the operation of the engine governor will tend to make the engine "hunt". If the chipping drum speed and/or the saws speed fall too far, the speed of advance of the harvesters along the row(s) R must be reduced to enable either, or both, to return to their optimal speeds before the next tree is processed. The maintenance of the speed of the saws is assisted by manufacturing the saws with high inertial masses.

As described above, the planting of the trees has a number of environmental benefits, including: the creation of a micro-climate; and potential reduction in the salinity of the soil. As the trees are to be harvested, e.g., every four years, they should be looked upon as a "harvestable crop" (e.g. like grains or grasses) which is to be harvested and replaced by a new planting of trees. The harvested biomass can provide a renewable energy/input source for electricity generators, and for oil and carbon manufacturers. In addition, while the trees are growing, they will absorb $CO_2$ gas from the atmosphere and assist in reducing the effects of climate change.

As harvesting currently is approximately 70% of the cost between the growth of the trees and the supply to the processors, all available efficiencies in the harvesting process must be sought. By maintaining the trees in a substantially vertical position, after they have been cut and as they are fed to the chipper drum, minimal energy is used in handling the trees (as the orientation remains substantially constant); and the trees can be efficiently converted to biomass as they are fed downwardly (and rearwardly) stem-first to the chipper drums.

Various changes and modifications may be made to the embodiments described and illustrated without departing from the present invention.

The invention claimed is:

1. A harvesting head for a tree harvester, the harvester head including:
    a chipper drum rotatable about a first axis;
    first and second nip rollers rotatable about respective substantially parallel second and third axes, the second and third axes being vertically spaced above the first axis; and
    at least one drive that rotatably drives the chipper drum and the first and second nip rollers;
    the first, second and third axes are disposed substantially parallel to the direction of travel of the tree harvester, and are upwardly inclined to the horizontal from a leading end to a trailing end, so that the first and second nip rollers are operable to maintain a stem of a tree being harvested in a substantially vertical position, while simultaneously feeding the tree downwardly through and along the chipper drum.

2. A harvesting head as claimed in claim 1, wherein:
    the harvesting head has a pick-up front at the front of the harvesting head, the pick-up front having a guide comprising a rotating spiral and a guide member, the guide member being horizontally spaced from the rotating spiral, the rotating spiral and the guide member forming an inlet passage, the inlet passage being vertically spaced above, and extending forwardly of, the first and second nip rollers; and wherein the rotating spiral and the guide member are operable to engage and maintain the trees with their stems in a substantially vertical position, both before and after the stems have been cut from their respective tree stumps and also both before and during engagement of the stems by the first and second nip rollers.

3. A harvesting head as claimed in claim 2, wherein:
the pick-up front has two or more guides each comprising a rotating spiral and a guide member, the respective guides being vertically spaced apart from each other.

4. A harvesting head as claimed in claim 3, wherein:
each guide member is a guide bar or guide rail or a counter-rotating spiral.

5. A harvesting head as claimed in claim 4, wherein:
the respective longitudinal axis of each guide bar or each guide rail, or the rotational axes of each spiral and of each counter-rotating spiral, are upwardly inclined from their leading ends to their trailing ends.

6. A harvester head as claimed in claim 5, wherein:
the inclination of the longitudinal axis and the inclination of each of the rotational axes is substantially equal to the inclination of the first, second and third axes to the horizontal.

7. A harvesting head as claimed in claim 4, wherein:
each guide member is a counter-rotating spiral, and
each spiral and each counter-rotating spiral has a substantially horizontal lead-in spiral to assist in directing the trees to the harvesting head.

8. A harvesting head as claimed in claim 1, further comprising a support plate or a conveyor inclined to the horizontal substantially identical to the inclination of the longitudinal axis and of each of the rotational axes to the horizontal,
wherein:
a base cutter extends forwardly from the harvester head, and has a cutting head operating to sever the stems of the trees from their stumps, the cutter head being mounted at a forward end of the support plate or conveyor, and
the support plate or conveyor being configured to support lower ends of the stems as the trees are advanced towards the first and second nip rollers by the pick-up front.

9. A harvesting head as claimed in claim 8, wherein:
the cutter head has a rotary saw disc, or a chainsaw head, the cutting head being arranged at a small angle to, but just above, the level of the ground.

10. A harvesting head as claimed in claim 1, wherein:
an anvil is provided adjacent to, and spaced from the chipper drum; and
first and second nip rollers direct the lower ends of the stems of the trees downwardly and rearwardly along a path between the chipper drum and the anvil to cause the stems and foliage of the trees to be chipped or converted into biomass.

11. A harvesting head as claimed in claim 1, wherein:
the drive for the chipper drum, the drive for the first and second nip rollers, and the drive for the cutting head each includes a respective hydraulic motor connected to a main hydraulic pump.

12. A tree harvester, for harvesting at least one row of trees, including:
a harvester chassis mountable on, or attachable to, a prime mover;
at least one drive on the harvester chassis;
the harvesting head, as claimed in claim 1, operably mounted on the harvester chassis and operably connected to the drive.

13. A harvester as claimed in claim 12, wherein:
the harvester chassis is mounted on a self-propelled prime mover; or the harvester chassis is mounted on a towed vehicle connectable to a tractor or to a prime mover.

* * * * *